(12) United States Patent
Oshima et al.

(10) Patent No.: US 7,241,847 B2
(45) Date of Patent: Jul. 10, 2007

(54) PROCESS FOR PRODUCING CYCLOOLEFIN ADDITION POLYMER

(75) Inventors: Noboru Oshima, Tokyo (JP); Michitaka Kaizu, Tokyo (JP); Satoshi Ebata, Tokyo (JP); Takashi Imamura, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 10/568,423

(22) PCT Filed: Aug. 4, 2004

(86) PCT No.: PCT/JP2004/011156

§ 371 (c)(1),
(2), (4) Date: Feb. 14, 2006

(87) PCT Pub. No.: WO2005/019277

PCT Pub. Date: Mar. 3, 2005

(65) Prior Publication Data

US 2006/0217505 A1    Sep. 28, 2006

(30) Foreign Application Priority Data

Aug. 20, 2003 (JP) ............... 2003-296507
Jan. 30, 2004 (JP) ............... 2004-023576

(51) Int. Cl.
*C08F 4/70* (2006.01)
*C08F 32/08* (2006.01)

(52) U.S. Cl. .............. 526/145; 526/120; 526/121; 526/131; 526/133; 526/139; 526/171; 526/272; 526/279; 526/281

(58) Field of Classification Search ............. 526/171, 526/139, 145, 120, 121, 131, 133, 281, 273, 526/279
See application file for complete search history.

(56) References Cited

U.S. PATENT DOCUMENTS

| | | | |
|---|---|---|---|
| 3,330,815 A | | 7/1967 | McKeon et al. |
| 5,629,398 A | * | 5/1997 | Okamoto et al. ........... 526/281 |
| 6,455,650 B1 | | 9/2002 | Lipian et al. |
| 6,727,329 B2 | * | 4/2004 | Vogel ......................... 526/127 |

FOREIGN PATENT DOCUMENTS

| | | |
|---|---|---|
| JP | 05-262821 | 10/1993 |
| JP | 10-130323 | 5/1998 |
| JP | 11-505877 | 5/1999 |
| JP | 2000-169517 | 6/2000 |
| JP | 2001-098035 | 4/2001 |
| JP | 2002-504172 | 2/2002 |
| JP | 2002-531648 | 9/2002 |
| JP | 2003-040929 | 2/2003 |
| JP | 2003-160620 | 6/2003 |
| WO | 00/20472 | 4/2000 |

OTHER PUBLICATIONS

Janiak, Christoph et al., "The Vinyl Homopolymerization of Norbornene", Macromol. Rapid Commun., vol. 22, pp. 479-492, 2001.
Schultz, Robert G., "The Chemistry of Palladium Complexes. III. The Polymerization of Norbornene Systems Catalyzed By Palladium Chloride (1)", Polymer Letters, vol. 4, pp. 541-546, 1966.
Breunig, Stefan et al., "Transition-metal-catalyzed vinyl addition polymerizations of norbornene derivatives with ester groups", Makromol. Chem., vol. 193, pp. 2915-2927, 1992.
Safir, Adam L. et al., "Living 1,2-Olefin-Insertion Polymerizations Initiated by Palladium(II) Alkyl Complexes: Block Copolymers and a Route to Polyacetylene-Hydrocarbon Diblocks", Macromolecules, vol. 28, pp. 5396-5398, 1995.
Mathew, Joice P. et al., "(η3-Allyl) Palladium (II) Nitrile Catalysts for the Addition Polymerization of Norbornene Derivatives with Functional Groups", Macromolecules, vol. 29, pp. 2755-2763, 1996.
Reinmuth, Annette et al., "(η3-Allyl) Palladium (II) catalysts for the addition polymerization of norbornene derivatives with functional groups", vol. 17, pp. 173-180, 1996.
Heinz, B. S. et al., "Poly (nonbomene carboxylic acid ester) s: Synthesis and Properties", Acta Polymer, vol. 48, pp. 385-391, 1997.
Heinz, Beate S. et al., "Pd (II)-catalyzed vinylic polymerization of norbornene and copolymerization with norbomene carboxylic acid esters", Macromol. Rapid Commun., vol. 19, pp. 251-256, 1998.
Grove, Nicole R. et al., "Functionalized Polynorbornene Dielectric Polymers: Adhesion and Mechanical Properties", Journal of Polymer Science: Part B: Polymer Physics, vol. 37, pp. 3003-3010, 1999.
Hennis, April D. et al., "Novel, Efficient, Palladium-Based System for the Polymerization of Norbornene Derivatives: Scope and Mechanism", Organometallics, vol. 20, pp. 2802-2812, 2001.
Son, Seung Uk et al., "Use of the Pauson-Khand Reaction Products as Monomers in the Palladium (II)-Catalyzed Homopolymerization and Copolymerization of Norbomene Derivatives", Journal of Polymer Science: Part A: Polymer Chemistry, vol. 41, pp. 76-83, 2003.
Lipian, John et al., "Addition Polymerization of Norbornene-Type Monomers. High Acitivity Cationic Allyl Palladium Catalysts", Macromolecules, vol. 35, pp. 8969-8977, 2002.
U.S. Appl. No. 10/581,525, filed Jun. 2, 2006, Ebata et al.
U.S. Appl. No. 10/568,423, filed Feb. 14, 2006, Oshima et al.

* cited by examiner

*Primary Examiner*—Fred Teskin
(74) *Attorney, Agent, or Firm*—Oblon, Spivak, McClelland, Maier & Neustadt, P.C.

(57) ABSTRACT

A process for producing a cycloolefin addition polymer in which one or more cycloolefin monomers can be (co)polymerized by addition polymerization with a small palladium catalyst amount to produce a cycloolefin addition (co)polymer while attaining high catalytic activity. The process for cycloolefin addition polymer production is characterized by addition-polymerizing one or more cycloolefin monomers comprising a cycloolefin compound represented by a specific formula in the presence of a multi-component catalyst comprising (a) a palladium compound and (b) a specific phosphorus compound.

18 Claims, No Drawings

PROCESS FOR PRODUCING CYCLOOLEFIN ADDITION POLYMER

TECHNICAL FIELD

The present invention relates to a process for producing a cycloolefin addition polymer. More particularly, the invention relates to a process for producing a cycloolefin addition polymer in which one or more cycloolefin compounds are addition-polymerized in the presence of a specific catalyst comprising a palladium compound having excellent polymerization activity to produce a cycloolefin addition polymer that is preferably used for optical materials and the like.

BACKGROUND ART

With demands for lightening, miniaturizing and densification, substitution of optically transparent resins for inorganic glasses has been advanced recently in fields of optical parts, such as lenses and sealing materials, and liquid crystal display element parts, such as back lights, light guide plates, substrates for TFT and touch panels, where inorganic glasses have been heretofore employed. As the optically transparent resins, addition polymers of norbornene (bicyclo[2.2.1]hept-2-ene) type having features of high transparency, high heat resistance and low water absorption properties have been paid attention.

Further, as transparent resins having, in addition to the above features, small coefficient of linear expansion, excellent thermal dimensional stability, excellent chemical resistance and excellent adhesion to other materials, addition polymers of norbornene (bicyclo[2.2.1]hept-2-ene) and cycloolefins having a hydrolyzable silyl group and their crosslinked products have been proposed (see patent document 1).

Addition polymers of cycloolefins such as norbornene have been obtained by addition polymerization of cycloolefin monomers by the use of catalysts using compounds of transition metals such as Ni, Pd, Ti, Zr and Cr (see, e.g., non-patent document 1)

Addition copolymers of cycloolefin compounds having a polar substituent in the side chain and non-polar cycloolefin compounds are useful as copolymers not only having excellent heat resistance and transparency but also being capable of crosslinking to improve adhesion properties, dimensional stability and chemical resistance, and as polymerization catalysts for obtaining these copolymers, single complexes of late transition metals, such as Ni and Pd, or multi-component catalysts containing Ni or Pd compounds have been mainly employed (see patent documents 1 and 2, non-patent documents 2 to 11).

Of these catalysts, the multi-component catalysts are industrially employed more frequently rather than the single-component catalysts, in order to omit a complicated catalyst synthesis process.

As catalysts of excellent polymerization activity, those using a phosphine compound or an amine compound as a Pd cation ligand and as a neutral donor and using a superstrong acid anion as a weak counter anion ligand are known (see patent documents 1 and 3 to 6, non-patent document 12).

Such multi-component catalysts as used in the prior art are obtained by preparing any of the following catalyst systems.

Catalyst System I
(1) Pd compound
(2) Neutral phosphine or amine compound
(3) Ionic compound capable of becoming weak counter anion for Pd cation
(4) Organoaluminum compound Catalyst System II
(1) Pd compound having neutral phosphine or amine compound as ligand
(2) Ionic compound capable of becoming weak counter anion for Pd cation
(3) Organoaluminum compound Catalyst System III
(1) Pd compound having, as ligand, neutral donor having Pd—C bond, such as σ-alkyl, σ-aryl or π-allyl
(2) Ionic compound capable of becoming weak counter anion for Pd cation Catalyst System IV
(1) Pd compound having, as ligand, neutral donor having Pd—C bond, such as σ-alkyl, σ-aryl or π-allyl
(2) Lewis acid compound In any of the above catalysts, a phosphine or amine compound as a neutral donor is contained. In case of Pd compounds having, as a ligand, a neutral donor and having Pd—C bond, such as σ-alkyl, σ-aryl or π-allyl, however, syntheses of their complexes become complicated, so that it cannot be necessarily said that they are industrially advantageous. In the prior art, any catalyst having as its constituent an ionic phosphonium salt instead of such a neutral donor has not been known heretofore.

In the case where polymerization of 5-trialkoxysilylbicyclo[2.2.1]hept-2-ene having a hydrolyzable silyl group and bicylo[2.2.1]hept-2-ene (norbornene) having no substituent in the side chain is carried out in a hydrocarbon solvent using a conventional neutral donor catalyst system, a polymer having a compositional distribution is liable to be produced, or precipitation sometimes take place during the polymerization, or the resulting polymer sometimes becomes opaque. It is thought that this is caused by that reactivity of the 5-trialkoxysilylbicyclo[2.2.1]hept-2-ene is higher than that of the bicylo[2.2.1]hept-2-ene, so that the 5-trialkoxysilylbicyclo[2.2.1]hept-2-ene is polymerized in a larger ratio compared to a ratio of these charged monomers at the stage of the beginning of the polymerization, and as a result, a polymer having structural units derived from the 5-trialkoxysilylbicyclo[2.2.1]hept-2-ene in a higher proportion is formed, that is, a compositional distribution regarding the structural units of the polymer occurs, and consequently, solubility in the polymerization solvent or compatibility with the polymer formed in the latter half of the polymerization reaction is lowered.

Moreover, if a compositional distribution regarding the structural units derived from the 5-trialkoxysilylbicyclo[2.2.1]hept-2-ene occurs, crosslink network of a crosslinked product obtained by crosslinking the polymer utilizing the hydrolyzable siyl group becomes ununiform, and the crosslinked product sometimes has poor dimensional stability.

Therefore, as a polymerization process substantially bringing about no compositional distribution, a process wherein one of the monomers is continuously or successively added to the polymerization system can be considered. However, it is thought that such a control becomes difficult if a reactivity ratio of the monomer copolymerized greatly differs.

As a means to prevent precipitation even if such a compositional distribution occurs, copolymerization of the 5-trialkoxysilylbicyclo[2.2.1]hept-2-ene and a cycloolefin compound having an alkyl group of 3 or more carbon atoms as a side chain substituent can be considered. In this case, however, when a film or a sheet is formed from the resulting copolymer, the film or the sheet has a too large coefficient of liner expansion though it has flexibility, and a problem of dimensional stability sometimes takes place. In this case, further, the compositional distribution sometimes becomes much larger, and therefore, a problem of transparency of the resulting polymer and a problem of uniformity of a crosslink network of a crosslinked product formed from the polymer is liable to take place.

In the polymerization reaction of a cycloolefin compound having an ester group or an oxetane group with the bicylo[2.2.1]hept-2-ene, reactivity of the cycloolefin compound having an ester group or an oxetane group is lower than that of the bicylo[2.2.1]hept-2-ene differently from the case of using the aforesaid cycloolefin compound having a hydrolyzable silyl group, so that a polymer having structural units derived from the cycloolefin compound having an ester group or an oxetane group in a lower proportion is formed at the stage of the beginning of the polymerization. With regard to occurrence of a compositional distribution, however, this polymerization is similar to that using the cycloolefin compound having a hydrolyzable silyl group, and the same problems sometimes take place.

On this account, there has been desired a catalyst system which does not substantially bring about the aforesaid compositional distribution in the polymerization reaction of a cycloolefin compound having a polar substituent such as a hydrolyzable silyl group, an ester group or an oxetane group with a non-polar cycloolefin compound and therefore which does not cause precipitation or turbidity of the resulting polymer during the polymerization using a hydrocarbon solvent.

Further, the Pd catalyst is expensive, and remaining of a large amount of the Pd catalyst in the polymer causes coloring or a lowering of transparency of the polymer, and accordingly, there has been desired a catalyst capable of performing polymerization in a small catalytic amount and showing high polymerization activity.

Furthermore, although the multi-component catalyst containing the Pd compound has higher resistance to water or methanol than the multi-component catalyst containing a compound of an early transition metal of Ti or Zr, phosphine that is added as a neutral donor to improve polymerization activity is liable to be oxidized and becomes phosphine oxide if oxygen is present when it is stored, and as a result, lowering of polymerization activity is sometimes brought about. Especially in the polymerization with a small catalytic amount, the catalyst becomes different even in the presence of a trace amount of oxygen, and the influence of oxygen is great.

On this account, a catalyst system which brings about little variability in the polymerization rate and the quality of the resulting polymer even in the presence of a trace amount of oxygen in the polymerization system has been desired from the viewpoint of industrials production.

Moreover, production of a cycloolefin addition polymer crosslinked product having adhesion properties or solvent resistance and chemical resistance usually includes a step of producing a copolymer that is a precursor of the crosslinked product by performing addition polymerization reaction of a cycloolefin compound having a polar substituent that becomes a crosslinking group, such as a hydrolyzable silyl group or an ester group, with a non-polar cycloolefin compound. From the copolymer formed by such an addition polymerization reaction, however, removal of palladium atom is difficult in many cases, and a large amount of residual palladium in the resulting copolymer causes a problem of lowering of optical transparency.

Patent document 1: U.S. Pat. No. 6,455,650
Patent document 2: U.S. Pat. No. 3,330,815
Patent document 3: Japanese Patent Laid-Open Publication No. 262821/1993
Patent document 4: WO 00/20472
Patent document 5: Japanese Patent Laid-Open Publication No. 130323/1998
Patent document 6: Japanese Patent Laid-Open Publication No. 98035/2001
Non-patent document 1: Christoph Janiak, Paul G. Lassahn, Macromol. Rapid Commun. 22,. p. 479 (2001)
Non-patent document 2: R. G. Schultz, Polym. Lett. Vol. 4, p. 541 (1966)
Non-patent document 3: Stefan Breunig, Wilhelm Risse, Makromol. Chem. 193, 2915 (1992)
Non-patent document 4: Adam L. Safir, Bruce M. Novak Macromolecules, 28, 5396 (1995)
Non-patent document 5: Joice P. Mathew et al., Macromolecules, 29, 2755-2763 (1996)
Non-patent document 6: Annette Reinmuth et al., Macromol. Rapid Commun. 17 173-180 (1996)
Non-patent document 7: B. S. Heinz, Acta Polymer 48, 385 (1997)
Non-patent document 8: B. S. Heinz et al., Macromol. Rapid Commun. 19, 251 (1998)
Non-patent document 9: Nicole R. Grove et al., J. Polym. Sci. Part B, 37, 3003 (1999)
Non-patent document 10: April D. Hennis et al., organometallics, 20, 2802 (2001)
Non-patent document 11: Seung UK Son et al., J. Polym. Sci. Part A, Polym. Chem. 41, 76 (2003)
Non-patent document 12: John Lipian et al., Macromolecules, 35, 8969-8977 (2002)

The present invention has been made under such circumstances as described above, and it is an object of the present invention to provide a process for producing a cycloolefin addition polymer in which one or more cycloolefin monomers can be addition-(co)polymerized with a small amount of a palladium catalyst and a cycloolefin (co)polymer can be produced with high activity.

It is another object of the present invention to provide a process for producing a cycloolefin addition polymer using a catalyst of high polymerization activity, in which when a monomer composition comprising a specific cycloolefin compound and a cycloolefin compound having a polar substituent such as a hydrolyzable silyl group is polymerized, a compositional distribution regarding structural units derived from the cycloolefin compound having a polar substituent is not substantially brought about.

It is a further object of the present invention to provide a process for producing a cycloolefin addition polymer using a novel catalyst whose polymerization activity is little influenced even when a trace amount of oxygen is present in the (co)polymerization reaction of cycloolefin compounds and which is capable of carrying out addition (co)polymerization with high activity even when monomers containing a cycloolefin compound having a polar substituent such as a hydrolyzable silyl group are (co) polymerized.

DISCLOSURE OF THE INVENTION

The process for producing a cycloolefin addition polymer of the present invention comprises addition-polymerizing one or more cycloolefin monomers comprising a cycloolefin compound represented by the following formula (1) in the presence of a multi-component catalyst comprising:

(a) a palladium compound, and (b) one or more phosphorus compounds selected from the group consisting of the following compounds (b-1) and (b-2):

(b-1) a phosphonium salt represented by the following formula (b1):

$$[PR^2R^3R^4R^5]^+[CA_1]^-  \quad (b1)$$

wherein P is a phosphorus atom, $R^2$ is a substituent selected from a hydrogen atom, an alkyl group of 1 to 20 carbon atoms, a cycloalkyl group and an aryl group, $R^3$ to $R^5$ are each independently a substituent selected from an alkyl group of 1 to 20 carbon atoms, a cycloalkyl group and an aryl group, and $[CA_1]^-$ is a counter anion selected from a carboxylic acid anion, a sulfonic acid anion and a superstrong acid anion containing an atom selected from B, P and Sb and a F atom, (b-2) an addition complex of a phosphine compound that contains a substituent selected from an alkyl group of 3 to 15 carbon atoms, a cycloalkyl group and an aryl group and has a cone angle (θ deg) of 170 to 200 and an organoaluminum compound;

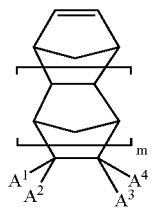

(1)

wherein $A^1$ to $A^4$ are each independently an atom or a group selected from the group consisting of a hydrogen atom, a halogen atom, an alkyl group of 1 to 15 carbon atoms, a cycloalkyl group, an aryl group, an ester group, an oxetanyl group, an alkoxy group, a trialkylsilyl group and a hydroxyl group, and may be each bonded to a cyclic structure through a bond group of 0 to 10 carbon atoms, said bond group containing at least one group or atom selected from an alkylene group of 1 to 20 carbon atoms, an oxygen atom, a nitrogen atom and a sulfur atom, $A^1$ and $A^2$ may form an alkylidene group of 1 to 5 carbon atoms, a substituted or unsubstituted alicyclic or aromatic ring of 5 to 20 carbon atoms or a heterocyclic ring of 2 to 20 carbon atoms, $A^1$ and $A^3$ may form a substituted or unsubstituted alicyclic or aromatic ring of 5 to 20 carbon atoms or a heterocyclic ring of 2 to 20 carbon atoms, and m is 0 or 1.

In the process for producing a cycloolefin addition polymer of the invention, there are the following two preferred embodiments.

1. An embodiment wherein the multi-component catalyst comprises (a) a palladium compound, (b-1) a phosphorus compound represented by the formula (b1), and (c) a compound selected from an ionic boron compound, an ionic aluminum compound, an aluminum compound of Lewis acidity and a boron compound of Lewis acidity.

2. An embodiment wherein the multi-component catalyst comprises (a) a palladium compound, (b-2) a phosphorus compound represented by the formula (b2), and (d) an organoaluminum compound.

In the embodiment (2), the content of the organoaluminum compound (d) is preferably in the range of 0.1 to 200 mol based on 1 gram atom of palladium of the palladium compound (a).

In the process for producing a cycloolefin addition polymer of the invention, the palladium compound (a) is preferably an organic carboxylate of palladium or a β-diketone compound of palladium.

In the process for producing a cycloolefin addition polymer of the invention, the multi-component catalyst is preferably a catalyst prepared in the presence of at least one compound selected from the group consisting of a polycyclic monoolefin or non-conjugated diene having a bicyclo[2.2.1]hept-2-ene structure, a monocyclic non-conjugated diene and a straight-chain non-conjugated diene.

In the process for producing a cycloolefin addition polymer of the invention, the multi-component catalyst is preferably a catalyst prepared in the presence of bicyclo[2.2.1]hept-2-ene and/or a bicyclo[2.2.1]hept-2-ene derivative having one or more hydrocarbon groups of 1 to 15 carbon atoms.

In the process for producing a cycloolefin addition polymer of the invention, the cycloolefin monomers preferably contain a cycloolefin compound represented by the following formula (2)-1 or (2)-2:

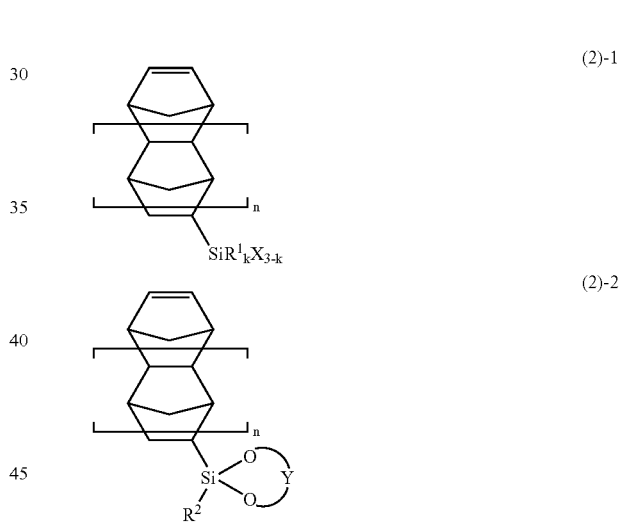

wherein $R^1$ and $R^2$ are each a substituent selected from an alkyl group of 1 to 10 carbon atoms, a cycloalkyl group and an aryl group, X is an alkoxy group of 1 to 5 carbon atoms or a halogen atom, Y is a residue of a hydroxyl group of an aliphatic diol of 2 to 4 carbon atoms, k is an integer of 0 to 2, and n is 0 or 1.

In the process for producing a cycloolefin addition polymer of the invention, the cycloolefin compound represented by the formula (2)-1 and/or the cycloolefin compound represented by the formula (2)-2 is preferably used in a total amount of 0.1 to 30% by mol in the whole amount of all the cycloolefin monomers.

In the process for producing a cycloolefin addition polymer of the invention, the cycloolefin monomer of the formula (1) wherein $A^1$ to $A^4$ are each independently a hydrogen atom or a hydrocarbon group of 1 to 15 carbon atoms is preferably used in an amount of not less than 50% by mol in the whole amount of all the cycloolefin monomers.

The present application declares the right of priority from Japanese Patent Application No. 296507/2003 and Japanese Patent Application No. 23576/2004 and claims them by citing them.

BEST MODE FOR CARRYING OUT THE INVENTION

The present invention is described in detail hereinafter.

In the process for producing a cycloolefin addition polymer of the invention, addition polymerization of one or more cycloolefin monomers is carried out using a multi-component catalyst comprising a palladium compound (a) and a specific phosphorus compound (b).

Multi-component Catalyst

The multi-component catalyst for use in the invention comprises:
(a) a palladium compound, and
(b) one or more phosphorus compounds selected from the group consisting of the following compounds (b-1) and (b-2):
(b-1) a phosphonium salt represented by the following formula (b1):

wherein P is a phosphorus atom, $R^2$ is a substituent selected from a hydrogen atom, an alkyl group of 1 to 20 carbon atoms, a cycloalkyl group and an aryl group, $R^3$ to $R^5$ are each independently a substituent selected from an alkyl group of 1 to 20 carbon atoms, a cycloalkyl group and an aryl group, and $[CA_1]^-$ is a counter anion selected from a carboxylic acid anion, a sulfonic acid anion and a super-strong acid anion containing an atom selected from B, P and Sb and a F atom, (b-2) an addition complex of a phosphine compound that contains a substituent selected from an alkyl group of 3 to 15 carbon atoms, a cycloalkyl group and an aryl group and has a cone angle (θ deg) of 170 to 200 and an organoaluminum compound.

Such a multi-component catalyst for use in the invention further comprises, if necessary, (c) a compound selected from an ionic boron compound, an ionic aluminum compound, an aluminum compound of Lewis acidity and a boron compound of Lewis acidity, and/or (d) an organoaluminum compound.

Next, each component of the multi-component catalyst for use in the invention is described.

(a) Palladium Compound

The palladium compound (a) is, for example, an organic carboxylate, an organic phosphite, an organic phosphate, an organic sulfonate, a β-diketone compound or a halide of palladium. Of these, an organic carboxylate of palladium or a β-diketone compound of palladium is preferable because such a compound is easily dissolved in a hydrocarbon solvent and has high polymerization activity.

Examples of the above compounds include organic carboxylates of palladium, such as acetate, propionate, maleate, fumarate, butyrate, adipate, 2-ethylhexanoate, naphthenate, oleate, dodecanoate, neodecanoate, 1,2-cyclohexanedicarboxylate, bicyclo[2.2.1]hept-5-ene-2-carboxylate, 5-norbornene-2-caroxylate, benzoate, phthlate, terephthalate and naphthoate of palladium; complexes of organic carboxylates of palladium, such as triphenylphosphine complex of palladium acetate, tri(m-tolyl)phosphine complex of palladium acetate and tricyclohexylphosphine complex of palladium acetate; phosphites and phosphates of palladium, such as dibutylphosphite, dibutylphosphate, dioctylphosphate and dibutylphosphate ester salt of palladium; organic sulfonates of palladium, such as dodecylbenzenesulfonate and p-toluenesulfonate of palladium; β-diketone compounds of palladium, such as bis(acetylacetonato)palladium, bis(hexafluoroacetylacetonato)palladium, bis(ethylacetoacetate) palladium and bis(phenylacetoacetate)palladium; and halide complexes of palladium, such as dichlorobis(triphenylphosphine)palladium, dichlorobis[tri(m-tolylphosphine)]palladium, dibromobis[tri(m-tolylphosphine)]palladium, dichlorobis[tri(m-xylylphosphine)]palladium, dibromobis[tri(m-xylylphosphine)]palladium, imidazole complex represented by $[C_3H_5N_2]_2[PdCl_4]$ and acetonyl triphenylphosphonium complex represented by $[Ph_3PCH_2C(O)CH_3]_2[Pd_2Cl_6]$. Also employable are 0-valent palladium compounds which are combined with halides, such as aryl chloride, benzyl chloride, bromobenzene, chlorobenzene and bromonaphthalene, to form aryl or allyl palladium halides in the presence of a specific phosphine compound described in the addition complex (b-2) in the invention, specifically, dibenzylidene acetone palladium $[Pd_2(dba)_3]$ and tetrakis[triphenylphosphine]palladium $[Pd(P(Ph)_3)_4]$.

In the present invention, it is also preferable to use, as the palladium compound (a), a compound represented by the following formula (a1):

wherein R is an anion selected from organic carboxylic acid of 1 to 20 carbon atoms, organic sulfonic acid, organic phosphoric acid, mono or diphosphoric acid ester, organic phosphorous acid and β-diketone, and X is a halogen atom.

Although examples of the compounds represented by the formula (a1) are not specifically restricted, they include II-valent palladium halide compounds, such as acetic acid palladium chloride, 2-ethylhexanoic acid palladium chloride, naphthenic acid palladium chloride, oleic acid palladium chloride, dodecanoic acid palladium chloride, neodecanoic acid palladium chloride, dibutylphosphorous acid palladium chloride, dibutylphosphoric acid palladium chloride, palladium chloride of phosphoric acid dibutyl ester, dodecylbenzenesulfonic acid palladium chloride, p-toluenesulfonic acid palladium chloride and acetylacetonatopalladium chloride.

(b) Phosphorus Compound

The phosphorus compound (b) is, for example, one or more phosphorus compounds selected from the group consisting of the following compounds (b-1) and (b-2).

(b-1) A phosphonium salt represented by the following formula (b1):

wherein P is a phosphorus atom, $R^2$ is a substituent selected from a hydrogen atom, an alkyl group of 1 to 20 carbon atoms, a cycloalkyl group and an aryl group, $R^3$ to $R^5$ are each independently a substituent selected from an alkyl group of 1 to 20 carbon atoms, a cycloalkyl group and an aryl group, and $[CA_1]^-$ is a counter anion selected from a carboxylic acid anion, a sulfonic acid anion and a super-strong acid anion containing an atom selected from B, P and Sb and a F atom.

(b-2) An addition complex of a phosphine compound that contains a substituent selected from an alkyl group of 3 to 15 carbon atoms, a cycloalkyl group and an aryl group and has a cone angle (θ deg) of 170 to 200 and an organoaluminum compound.

The above phosphorus compounds are described below.

The compound (b-1) is a phosphonium salt represented by the above formula (b1). Although examples of the phosphonium salts for use in the invention are not specifically restricted, they include tetraphenylphosphonium tetra(pentafluorophenyl)borate, tricyclohexylphosphonium tetra(pentafluorophenyl)borate, tricyclohexylphosphonium tetrafluoroborate, tricyclohexylphosphonium octanoate, tricyclohexylphosphonium acetate, tricyclohexylphosphonium trifluoromethanesulfonate, tricyclohexylphosphonium p-toluenesulfonate, tricyclohexylphosphonium hexafluoroacetylacetonate, tricyclohexylphosphonium hexafluoroantimonate, tricyclohexylphosphonium dodecylbenzenesulfonate, triphenylphosphonium tetrakis (pentafluorophenyl)borate, triphenylphosphonium hexafluorophosphonate, tris(3-methylpheny)phosphonium tetrakis(3,5-trifluoromethylphenyl)borate, trioctylphosphonium tetrakis (3,5-trifluoromethylphenyl) borate, trioctylphosphonium p-toluenesulfonate, tri(o-tolyl) phosphonium tetra(pentafluorophenyl)borate, tri(pentafluorophenyl) phosphonium trifluoromethanesulfonate and tri(t-butyl) phosphonium trifluoromethanesulfonate. Preferable are tricylohexylphosphonium salt, tri(pentafluorophenyl)phosphonium salt and tri(o-tolyl)phosphonium salt.

In the present invention, by the use of the phosphonium salt (b-1) as the phosphorus compound (b), a copolymer of small compositional distribution can be obtained by copolymerization reaction, and therefore, it can be favorably prevented that the resulting cycloolefin addition polymer is made to have an extremely high molecular weight to give a polymer solution in a solid and swollen state or to cause precipitation of the polymer. On this account, the resulting cycloolefin addition polymer can be favorably used for forming a film, a sheet, a thin film or the like by a solution casting method.

The compound (b-2) is an addition complex of a phosphine compound that contains a substituent selected from an alkyl group of 3 to 15 carbon atoms, a cycloalkyl group and an aryl group and has a cone angle (θ deg) of 170 to 200 and an organoaluminum compound. In the present invention, it is an important technical requirement to use the specific phosphine compound as a raw material of the component (b-2). If another phosphine compound is used, the resulting cycloolefin addition polymer is made to have an extremely high molecular weight to give a polymer solution in a solid and swollen state or to cause precipitation of the polymer, and in this case, formation of a film, a sheet or a thin film by a solution casting method sometimes becomes difficult.

The phosphine compound used as a raw material of the component (b-2) is a trivalent electron donative phosphorus compound (tertiary phosphine compound) having an alkyl group, a cyloalkyl group or an aryl group as a substituent. The cone angle (θ deg) of the tertiary phosphine compound is calculated by C. A. Tolman (Chem. Rev. Vol 77, 313 (1977)) and is a conical angle θ measured about a model that is formed by a metal atom and three substituents of a phosphorus atom and by setting a bond distance between the metal atom and the phosphorus atom to 2.28 Å.

Preferred examples of the phosphine compounds having a cone angle (θ deg) of 170 to 200 for use in the invention include tricyclohexylphosphine, di-t-butylphenylphosphine, trineopentylphosphine, tri(t-butyl)phosphine, tri(pentafluorophenyl)phosphine and tri(o-tolyl)phosphine. Also available are di-t-butyl-2-biphenylphosphine, di-t-butyl-2'-dim-ethylamino-2-biphenylphosphine, dicyclohexyl-2-biphenylphosphine, dicyclohexyl-2'-i-propyl-2-biphenylphosphine, etc.

The organoaluminum compound used as a raw material of the component (b-2) acts as Lewis acid, is a compound that forms an addition complex together with the above-mentioned phosphine compound, and is a compound having at least one aluminum-alkyl bond. Such an organoaluminum compound is preferably an organoaluminum compound having such a degree of acidity that when the organoaluminum compound is coordinated to xanthone in a manner described in the literature "Saegusa et al., Catalysts, Vol. 7, p. 43 (1965)", a shift value ($\Delta v_{C=O}$) of an absorption spectrum of stretching vibration given by carbonyl (C=O) of the xanthone, as measured by means of an infrared spectrum, is not less than 50 cm$^{-1}$.

Preferred examples of such organoaluminum compounds include methylaluminum dichloride, ethylaluminum dichloride, butylaluminum dichloride, sesquiethylaluminum chloride, diethylaluminum chloride, diethylaluminum fluoride, diethylaluminum bromide, dibutylaluminum chloride, triethylaluminum, trimethylaluminum, tributylaluminum, trihexylaluminum and dibutylaluminum hydride. From the viewpoint of degree of acidity, alkylaluminum alkoxide compounds, such as diethylaluminum ethoxide, diethylauminum methoxide and ethylaluminum diethoxide, are undesirable.

The addition complex (b-2) of the specific phosphine compound and the organoaluminum compound is usually a complex wherein a ratio between the phosphine compound and the organoaluminum compound is 1:1 by mol. Such an addition complex can be formed by adding the organoaluminum compound to the specific phosphine compound in an amount of 1 to 10 mol based on 1 mol of the specific phosphine compound at a temperature of 0 to 100° C. and reacting them. For the formation of the complex, 1.0 mol of the organoaluminum compound based on 1 mol of the specific phosphine compound is enough, and excess organoaluminum compound acts as the later-described organoaluminum (d) that is a cocatalyst component.

In the present invention, it is preferable to use the addition complex (b-2) as the phosphorus compound (b) because oxidation resistance of the catalyst to oxygen is more increased as compared with a case of using a phosphine compound that is not in the form of a complex, and the resulting catalyst becomes stable even if it is stored in a solution state for a long period of time. Further, it is preferable to use the addition complex (b-2) because even if oxygen is present in the polymerization system, the degree of lowering of polymerization activity is low.

(c) Compound Selected from Ionic Boron Compound, Ionic Aluminum Compound, Aluminum Compound of Lewis Acidity and Boron Compound of Lewis Acidity When the phosphorus compound (b-1) is used as the component (b), the multi-component catalyst for use in the invention preferably contains (c) a compound selected from an ionic boron compound, an ionic aluminum compound, an aluminum compound of Lewis acidity and a boron compound of Lewis acidity.

Examples of the ionic boron compounds include triphenylcarbenium tetrakis(pentafluorophenyl)borate, triphenylcarbenium tetrakis[3,5-bis(trifluoromethyl)phenyl]borate, triphenylcarbenium tetrakis(2,4,6-trifluorophenyl) borate, triphenylcarbenium tetraphenylborate, tributylammonium tetrakis(pentafluorophenyl)borate, N,N-dimethylanilinium tetrakis(pentafluorophenyl)borate, N,N-diethylanilinium tetrakis(pentafluorophenyl)borate, N,N-diphenylanilinium tetrakis(pentafluorophenyl)borate and lithium tetrakis(pentafluorophenyl)borate.

Examples of the ionic aluminum compounds include triphenylcarbenium tetrakis(pentafluorophenyl)aluminate, triphenylcarbenium tetrakis[3,5-bis(trifluoromethyl)phenyl]aluminate, triphenylcarbenium tetrakis(2,4,6-trifluorophenyl)aluminate and triphenylcarbenium tetraphenylaluminate.

Examples of the aluminum compounds of Lewis acidity include aluminum trifluoride ether complex, ethyldifluoroaluminum, ethoxydifluoroaluminum, tris(pentafluorophenyl)aluminum, tris(3,5-difluorophenyl)aluminum and tris(3,5-ditrifluoromethylphenyl)aluminum.

Examples of the boron compound of Lewis acidity include tris(pentafluorophenyl)boron, tris(3,5-difluorophenyl)boron, tris(3,5-ditrifluoromethylphenyl)boron and boron trifluoride ether complex.

Of the above compounds (c), the ionic boron compound is most preferably used in the invention from the viewpoint of polymerization activity.

(d) Organoaluminum Compound

When the phosphorus compound (b-2) is used as the component (b), the multi-component catalyst for use in the invention preferably contains (d) an organoaluminum compound as a cocatalyst.

The organoaluminum compound (d) is an aluminum compound having at least one aluminum-alkyl group, and examples of such compounds preferably used include alkylalumoxane compounds, such as methylalumoxane, ethylalumoxane and butylalmoxane; trialkylaluminum compounds, such as trimethylaluminum, triethylaluminum and triisobutylaluminum; alkylaluminum compounds and alkylaluminum halide compounds, such as diisobutylaluminum hydride, diethylaluminum chloride, diethylaluminum fluoride, ethylaluminum sesquichloride and ethylaluminum dichloride; and mixtures of the above alkylalumoxane compounds and the above alkylaluminum compounds.

Preparation of Multi-component Catalyst

The multi-component catalyst for use in the invention contains the component (a), the component (b), and optionally the component (c) and/or the component (d) In the present invention, the amounts of these catalyst components are not specifically restricted, but these components are preferably used in the following amounts.

The palladium compound (a) is used in an amount of 0.0005 to 0.05 mmol in terms of Pd atom, preferably 0.001 to 0.05 mmol in terms of Pd atom, more preferably 0.005 to 0.01 mmol in terms of Pd atom, based on 1 mol of the cycloolefin monomers. Especially when an organic carboxylate or a β-diketone compound of palladium is used as the palladium compound, it can be addition-polymerized in an amount of not more than 0.01 mg, preferably 0.001 to 0.01 mmol, in terms of Pd atom, based on 1 mol of the cycloolefin monomers.

The specific phosphorus compound (b) is used in an amount of usually 0.05 to 20 mol based on 1 gram atom of Pd of the palladium compound (a). When the phosphonium salt (b-1) is used as the component (b), the phosphonium salt (b-1) is used in an amount of usually 0.5 to 20 mol, preferably 0.5 to 5 mol, based on 1 gram atom of Pd of the palladium compound (a). When the addition complex (b-2) is used as the component (b), the addition complex (b-2) is used in an amount of usually 0.1 to 10 mol, preferably 0.5 to 3.0 mol, based on 1 gram atom of Pd of the palladium compound (a).

The component (c) such as an ionic boron compound is particularly preferably used when the phosphonium salt (b-1) is used as the component (b), but when the addition complex (b-2) is used as the component (b), the component (c) is used when needed. When the multi-component catalyst contains the component (c), the component (c) is used in an amount of 0.2 to 20 mol, preferably 0.5 to 10 mol, more preferably 0.5 to 5 mol. based on 1 gram atom of Pd of the palladium compound (a).

The organoluaminum compound (d) is particularly preferably used when the addition complex (b-2) is used as the component (b), but when the phosphonium salt (b-1) is used as the component (b), the organoaluminum compound (d) is used when needed. By the use of the organoaluminum compound, effects that the polymerization activity is improved and the resistance of the catalyst system to impurities such as oxygen is increased can be expected. When the multi-component catalyst contains the organoaluminum compound (d), the organoaluminum compound (d) is used in an amount of 0.1 to 200 mol, preferably 0.5 to 200 mol, based on 1 gram atom of Pd of the palladium compound (a). When the phosphonium salt (b-1) is used as the component (b), the organoaluminum compound (d) is used in an amount of 0.5 to 10 mol based on 1 gram atom of Pd of the palladium compound (a), and when the addition complex (b-2) is used as the component (b), the organoaluminum compound (d) is used in an amount of 0.5 to 20 mol based on 1 gram atom of Pd of the palladium compound (a).

In the present invention, the multi-component catalyst comprising the above-mentioned components has only to be present in the polymerization system, and the preparation process such as order of addition of the catalyst components or the use method is not specifically restricted. That is to say, the components to constitute the multi-component catalyst may be previously mixed and the mixture is then added to the cycloolefin monomers, or they may be simultaneously or successively added directly to the polymerization system where the cycloolefin monomers are present.

Although the multi-component catalyst for use in the invention may be prepared by simply mixing the catalyst components or by adding them to the polymerization system as described above, it is also preferable to prepare the multi-component catalyst in the presence of a compound selected from a polycyclic monoolefin compound having a bicyclo[2.2.1]hept-2-ene structure, a polycyclic non-conjugated diene having a bicyclo[2.2.1]hept-2-ene structure, and a monocyclic or straight-chain conjugated diene or non-conjugated diene (said compound being also referred to as a "compound such as diene" hereinafter) Especially when the addition complex (b-2) is used as the component (b), preparation of the catalyst is desirably carried out in the presence of the compound such as diene. When the compound such as diene is used in the preparation of the multi-component catalyst, the compound such as diene can be used in an amount of usually 0.5 to 1000 mol based on 1 gram atom of Pd of the palladium compound (a). If the preparation of the multi-component catalyst is carried out in the presence of a straight-chain monoolefin compound and/or a monocyclic monoolefin compound, the polymerization activity of the catalyst is sometimes insufficient. If the preparation of the multi-component catalyst is carried out in the presence of a straight-chain conjugated or non-conjugated triene or higher polyene, the catalyst sometimes becomes solvent-insoluble or gelation of the resulting polymer sometimes takes place.

In the case where a polycyclic monoolefin having a bicyclo[2.2.1]hept-2-ene structure is used as a monomer and polymerization is carried out by introducing the catalyst components into the polymerization system in which the above monomer is present, no other compound such as diene than the polymerization monomer may be used in the preparation of the multi-component catalyst.

Examples of the polycyclic monoolefin compounds having bicyclo[2.2.1]hept-2-ene structure employable in the preparation of the multi-component catalyst include:
bicyclo[2.2.1]hept-2-ene,
tricyclo[5.2.1.0$^{2,6}$]dec-8-ene,
tricyclo[6.2.1.0$^{2,7}$]undec-9-ene,
tetracyclo[6.2.1.1$^{3,6}$.0$^{2,7}$]dodec-4-ene, and
compounds wherein the above compounds are substituted with alkyl of 1 to 15 carbon atoms, cycloalkyl or aryl,
each of said compounds being employable also as the later-described specific monomer (1).

Examples of the polycyclic non-conjugated diene compounds having bicyclo[2.2.1]hept-2-ene structure include:
bicyclo[2.2.1]hepta-2,5-diene,
tricyclo[5.2.1.0$^{2,6}$]deca-3,8-diene,
tetracyclo[6.2.1.1$^{3,6}$.0$^{2,7}$]dodeca-4,9-diene,
pentacyclo[9.2.0$^{2,10}$.0$^{3,8}$.1$^{1,11}$.1$^{4,7}$]pentadeca-5,12-diene,
1,4-bis(2-bicyclo[2.2.1]hept-5-enyl)butane,
1,4-bis (2-bicyclo[2.2.1]hept-5-enyl) hexane,
1,4-bis(2-bicyclo[2.2.1]hept-5-enylmethyl)benzene,
dimethylbis(2-bicyclo[2.2.1]hept-5-enylmethyl)silane,
methyltris(2-bicyclo[2.2.1]hept-5-enylmethyl)silane,
5-vinylbicyclo[2.2.1]hept-2-ene,
5-vinylidenebicyclo[2.2.1]hept-2-ene, and
5-isopropylidenebicyclo[2.2.1]hept-2-ene.

Examples of the straight-chain conjugated diene compounds include 1,3-butadiene, 2-methyl-1,3-butadiene, 2,3-dimethyl-1,3-butadiene, 2-phenyl-1,3-butadiene, 1,3-pentadiene and 1,3-hexadiene.

Examples of the monocyclic conjugated diene compounds include 1,3-cyclohexadiene and 1,3-cylclooctadiene.

Examples of the straight-chain non-conjugated diene compounds include 1,4-hexadiene and 1,5-hexadiene.

Examples of the monocyclic non-conjugated diene compounds include 1,4-cyclohexadiene and 1,5-cyclooctadiene.

From the viewpoint of polymerization activity, it is preferable to carry out preparation of the multi-component catalyst for use in the invention in the presence of a compound selected from the polycyclic monoolefin having a bicyclo[2.2.1]hept-2-ene structure, the polycyclic non-conjugated diene having a bicyclo[2.2.1]hept-2-ene structure and the monocyclic non-conjugated diene among the above compounds.

The catalyst formed from the components (a) and (b) and optionally the components (c) and (d) sometimes has low solubility in a hydrocarbon solvent, and depending upon the type of the polymerization solvent, precipitation sometimes takes place temporarily to lower the polymerization activity when the catalyst is added to the polymerization system. However, when preparation of the multi-component catalyst for use in the invention is carried out in the presence of the compound such as diene, the problem of lowering of polymerization activity can be lightened or eliminated. This effect is thought to be attributable to that a complex is formed between the compound such as diene and the multi-component catalyst when the multi-component catalyst is prepared in the presence of the compound such as diene. Moreover, in the case where the complex formed between the compound such as diene and the catalyst becomes a starting active site of the polymerization reaction, polymer chains extend in two directions in the polymerization, so that it becomes possible to obtain a polymer having a wide molecular weight distribution.

As the process for preparing the multi-component catalyst in the presence of the compound such as diene, there can be mentioned, for example, a) a process wherein the catalyst components (a) and (b) and if necessary the catalyst components (c) and (d) are previously mixed in the presence of the compound such as diene to prepare a catalyst and then the catalyst is added to a mixture of a monomer and a polymerization solvent, and b) a process wherein the catalyst components (a) and (b) and if necessary the catalyst components (c) and (d) are directly or successively added to a mixture of a monomer, a polymerization solvent and the compound such as diene to prepare a catalyst. In these processes, the order of addition of the catalyst components is not specifically restricted.

As the process for preparing the multi-component catalyst, further, c) a process wherein the addition complex (b-2) of a specific phosphine compound and a complex-forming organoaluminum compound is formed in the presence of a mixture of a monomer and a hydrocarbon solvent and then the catalyst component (a) and if necessary the catalyst components (c) and/or (d) are added is also employable. In this process, of the organoaluminum compound used for forming the addition complex (b-2), the excess organoaluminum compound, i.e., a portion exceeding 1 mol based on 1 mol of the specific phosphine compound, acts as an organoaluminum compound that is the optionally added component (d) functioning as a cocatalyst, so that it is possible to decrease the amount of the organoaluminum compound finally added as the component (d) or omit the organoaluminum compound.

Cycloolefin Monomer

In the process for producing a cycloolefin addition polymer of the invention, one or more cycloolefin monomers comprising a cycloolefin compound represented by the following formula (1) (referred to as a "specific monomer (1)" hereinafter) are addition-polymerized.

(1)

In the formula (1), $A^1$ to $A^4$ are each independently an atom or a group selected from the group consisting of a hydrogen atom, a halogen atom, an alkyl group of 1 to 15 carbon atoms, a cycloalkyl group, an aryl group, an ester group, an oxetanyl group, an alkoxy group, a trialkylsilyl group and a hydroxyl group, and may be each bonded to a cyclic structure through a bond group of 0 to 10 carbon atoms, said bond group containing at least one group or atom selected from an alkylene group of 1 to 20 carbon atoms, an oxygen atom, a nitrogen atom and a sulfur atom, $A^1$ and $A^2$ may form an alkylidene group of 1 to 5 carbon atoms, a substituted or unsubstituted alicyclic or aromatic ring of 5 to 20 carbon atoms or a heterocyclic ring of 2 to 20 carbon atoms, $A^1$ and $A^3$ may form a substituted or unsubstituted alicyclic or aromatic ring of 5 to 20 carbon atoms or a heterocyclic ring of 2 to 20 carbon atoms, and m is 0 or 1.

Examples of the specific monomers (1) are given below, but the invention is not limited to those examples.

Bicyclo[2.2.1]hept-2-ene,
5-Methyl-bicyclo[2.2.1]hept-2-ene,
5-Ethylbicyclo[2.2.1]hept-2-ene,
5-Propylbicyclo[2.2.1]hept-2-ene,
5-Butylbicyclo[2.2.1]hept-2-ene,
5-(1-Butenyl)bicyclo[2.2.1]hept-2-ene,
5-Pentylbicyclo[2.2.1]hept-2-ene,
5-Hexylbicyclo[2.2.1]hept-2-ene,
5-Heptylbicyclo[2.2.1]hept-2-ene,
5-Octylbicyclo[2.2.1]hept-2-ene,
5-Decylbicyclo[2.2.1]hept-2-ene,
5-Dodecylbicyclo[2.2.1]hept-2-ene,
5-Cyclohexyl-bicyclo[2.2.1]hept-2-ene,
5-Vinylbicyclo[2.2.1]hept-2-ene,
5-Allylbicyclo[2.2.1]hept-2-ene,
5-Ethylidenebicyclo[2.2.1]hept-2-ene,
5-Phenylbicyclo [2.2.1]hept-2-ene,
5,6-Dimethylbicyclo[2.2.1]hept-2-ene,
5-Methyl-6-ethylbicyclo[2.2.1]hept-2-ene,
5-Fluoro-bicyclo[2.2.1]hept-2-ene,
5-Chloro-bicyclo[2.2.1]hept-2-ene,
5-Benzyl-bicyclo[2.2.1]hept-2-ene,
5-Indanyl-bicyclo[2.2.1]hept-2-ene,
5-Trimethylsilyl-bicyclo[2.2.1]hept-2-ene,
5-Triethylsilyl-bicyclo[2.2.1]hept-2-ene,
5-Methoxy-bicyclo[2.2.1]hept-2-ene,
5-Ethoxy-bicyclo[2.2.1]hept-2-ene,
Tricyclo[5.2.1.0$^{2,6}$]dec-8-ene,
Tricyclo[5.2.1.0$^{2,6}$]deca-3,8-diene,
Tricyclo[6.2.1.0$^{2,7}$]undec-9-ene,
Tetracyclo[6.2.1.1$^{3,6}$.0$^{2,7}$]dodec-4-ene,
9-Methyltetracyclo[6.2.1.1$^{3,6}$.0$^{2,7}$]dodec-4-ene,
9-Ethyltetracyclo[6.2.1.1$^{3,6}$.0$^{2,7}$]dodec-4-ene,
Methyl bicyclo[2.2.1]hept-5-ene-2-carboxylate,
t-Butyl bicyclo[2.2.1]hept-5-ene-2-carboxylate,
Methyl bicyclo[2.2.1]hept-5-ene-2,3-dicarboxylate,
Bicyclo[2.2.1]hept-5-ene-2,3-carboxylic anhydride,
Bicyclo[2.2.1]hept-5-ene-N-cyclohexyl-2,3-carbonimide,
Bicyclo[2.2.1]hept-5-ene-N-phenyl-2,3-carbonimide,
Bicyclo[2.2.1]hept-5-ene-2-spiro-3'-exo-succinic anhydride,
Methyl bicyclo[2.2.1]hept-5-ene-2-carboxylate-methyl 2-carboxylate,
Bicyclo[2.2.1]hept-5-ene-2-spiro-butyrolactone,
Bicyclo[2.2.1]hept-5-ene-2-spiro-N-cyclohexyl-succinimide,
Bicyclo[2.2.1]hept-5-ene-2-spiro-N-phenyl-succinimide,
Methyl tetracyclo[6.2.1.1$^{3,6}$.0$^{2,7}$]dodec-9-ene-4-carboxylate,
Methyl 4-methyltetracyclo[6.2.1.1$^{3,6}$.0$^{2,7}$]dodec-9-ene-4-carboxylate,
5-[(3-Ethyl-3-oxetanyl)methoxy]bicyclo[2.2.1]hept-2-ene,
5-[(3-Oxetanyl)methoxy]bicyclo[2.2.1]hept-2-ene,
Spiro-5-(3-oxetanyl)bicyclo[2.2.1]hept-2-ene, and
(3-Eethyl-3-oxetanyl)methyl bicyclo[2.2.1]hept-5-ene-2-carboxylate.

The above specific monomers (1) may be used singly or in combination of two or more kinds.

In the present invention, it is also preferable to use, as a cycloolefin monomer, the specific monomer (1) of the formula (1) wherein $A^1$ to $A^4$ are each independently a hydrogen atom or a hydrocarbon group of 1 to 15 carbon atoms, in an amount of not less than 50% by mol in the whole amount of all the cycloolefin monomers.

In the present invention, the cycloolefin monomers also preferably further contain, in addition to the specific monomer (1), a cycloolefin compound represented by the following formula (2)-1 and/or a cycloolefin compound represented by the following formula (2)-2 (referred to as a "specific monomer (2)" hereinafter) When the cycloolefin monomers containing the specific monomer (2) are used, crosslinkability can be imparted to the resulting cycloolefin addition polymer. That is to say, by the use of the cycloolefin monomers containing the specific monomer (2), a hydrolyzable silyl group can be introduced into the molecule of the cycloolefin addition polymer, and the hydrolyzable silyl group acts as a crosslink site due to a siloxane bond. Further, the hydrolyzable silyl group also acts as a site for adhesion to other members, and therefore, it can be expected that use of the cycloolefin monomers containing the specific monomer (2) contributes to improvement of adhesion of the cycloolefin addition polymer to other members.

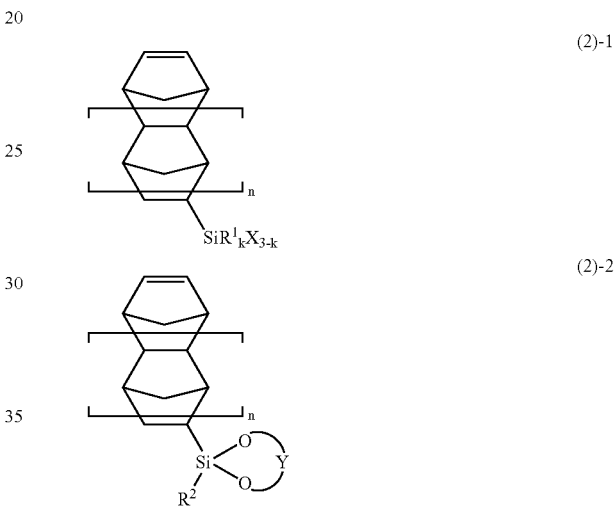

In the formulas (2)-1 and (2)-2, $R^1$ and $R^2$ are each a substituent selected from an alkyl group of 1 to 10 carbon atoms, a cycloalkyl group and an aryl group, X is an alkoxy group of 1 to 5 carbon atoms or a halogen atom, Y is a residue of a hydroxyl group of an aliphatic diol of 2 to 4 carbon atoms, k is an integer of 0 to 2, and n is 0 or 1.

Examples of the specific monomers (2) represented by the formula (2)-1 or the formula (2)-2 are given below, but the invention is not limited to those examples.

Examples of the specific monomers (2) represented by the formula (2)-i include the following compounds.

5-Trimethoxysilyl-bicyclo[2.2.1]hept-2-ene,
5-Triethoxysilyl-bicyclo[2.2.1]hept-2-ene,
5-Methyldimethoxysilyl-bicyclo[2.2.1]hept-2-ene,
5-Methyldiethoxysilyl-bicyclo[2.2.1]hept-2-ene,
5-Methyldichlorosilyl-bicyclo[2.2.1]hept-2-ene,
9-Trimethoxysilyl-tetracyclo[6.2.1.1$^{3,6}$.0$^{2,7}$]dodec-4-ene,
9-Triethoxysilyl-tetracyclo[6.2.1.1$^{3,6}$.0$^{2,7}$]dodec-4-ene,
9-Methyldimethoxysilyl-tetracyclo[6.2.1.1$^{3,6}$.0$^{2,7}$]dodec-4-ene,
9-Ethyldimethoxysilyl-tetracyclo[6.2.1.1$^{3,6}$.0$^{2,7}$]dodec-4-ene,
9-Cyclohexyldimethoxysilyl-tetracyclo[6.2.1.1$^{3,6}$.0$^{2,7}$]dodec-4-ene, 9-Phenyldimethoxysilyl-tetracyclo[6.2.1.1$^{3,6}$.0$^{2,7}$]dodec-4-ene,
9-Dimethylmethoxysilyl-tetracyclo[6.2.1.1$^{3,6}$.0$^{2,7}$]dodec-4-ene,
9-Trichlorosilyl-tetracyclo[6.2.1.1$^{3,6}$.0$^{2,7}$]dodec-4-ene,
9-Dichloromethylsilyl-tetracyclo[6.2.1.1$^{3,6}$.0$^{2,7}$]dodec-4-ene,
9-Chlorodimethylsilyl-tetracyclo[6.2.1.1$^{3,6}$.0$^{2,7}$]dodec-4-ene,
9-Chlorodimethoxysilyl-tetracyclo[6.2.1.1$^{3,6}$.0$^{2,7}$]dodec-4-ene,
9-Dichloromethoxysilyl-tetracyclo[6.2.1.1$^{3,6}$.0$^{2,7}$]dodec-4-ene, and
9-Chloromethylmethoxysilyl-tetracyclo[6.2.1.1$^{3,6}$.0$^{2,7}$]dodec-4-ene.

The above compounds may be used singly or in combination of two or more kinds.

Examples of the specific monomers (2) represented by the formula (2)-2 include the following compounds.
5-[1'-Methyl-2',5'-dioxa-1'-silacyclopentyl]-bicyclo[2.2.1]hept-2-ene,
5-[1'-Phenyl-2',5'-dioxa-1'-silacyclopentyl]-bicyclo[2.2.1]hept-2-ene,
9-[1'-Methyl-2',5'-dioxa-1'-silacyclopentyl]-tetracyclo[6.2.1.1$^{3,6}$.0$^{2,7}$]dodec-4-ene, and
9-[1'-Phenyl-2',5'-dioxa-1'-silacyclopentyl]-tetracyclo[6.2.1.1$^{3,6}$.0$^{2,7}$]dodec-4-ene.

The above compounds may be used singly or in combination of two or more kinds. One or more of the compounds represented by the formula (2)-1 and one or more of the compounds represented by the formula (2)-2 may be used in combination.

Of the above specific monomers (2), preferable are the following compounds.
5-Trimethoxysilyl-bicyclo[2.2.1]hept-2-ene,
5-Triethoxysilyl-bicyclo[2.2.1]hept-2-ene,
5-Methyldimethoxysilyl-bicyclo[2.2.1]hept-2-ene,
9-Trimethoxysilyl-tetracyclo[6.2.1.1$^{3,6}$.0$^{2,7}$]dodec-4-ene,
9-Methyldimethoxysilyl-tetracyclo[6.2.1.1$^{3,6}$.0$^{2,7}$]dodec-4-ene,
9-Triethoxysilyl-tetracyclo[6.2.1.1$^{3,6}$.0$^{2,7}$]dodec-4-ene,
5-[1'-Methyl-2',6'-dioxa-4',4'-dimethyl-1'-silacyclohexyl]-bicyclo[2.2.1]hept-2-ene, and
5-[1'-Methyl-2',6'-dioxa-4'-methyl-1'-silacyclohexyl]-bicyclo[2.2.1]hept-2-ene.

In the present invention, the amounts of the specific monomer (1) and the specific monomer (2) are not particularly restricted, and they have only to be properly selected according to the properties required for the resulting polymer. However, the specific monomer (1) is usually used in an amount of not less than 50% by mol based on the whole amount of all the monomers, and the specific monomer (2) is usually used in an amount of 0.1 to 30% by mol based on the whole amount of all the monomers.

In the present invention, it is preferable to use the specific monomer (1) and the specific monomer (2) in combination, and in this case, they are desirably used in such amounts that the total amount of the specific monomer (1) and the specific monomer (2) becomes not less than 80% by mol based on the whole amount of all the monomers and that the ratio (1)/(2) becomes 70-99.8/30-0.2, preferably 80-97/20-3, more preferably 85-95/15-5. By the use of these monomers (1) and (2) in such amounts, adhesion properties of the resulting polymer to other materials can be enhanced, and water (moisture) absorption distortion can be substantially inhibited. Moreover, crosslinking utilizing a specific polar group derived from the specific monomer (2) is facilitated, and a coefficient of linear expansion of the resulting crosslinked product becomes extremely low.

When the cycloolefin monomers contain the specific monomer (2) in the present invention, the specific monomer (2) is desirably used in an amount of 0.1 to 30% by mol, preferably 2 to 30% by mol, more preferably 5 to 20% by mol, in the whole amount of all the cycloolefin monomers.

In the case where the cycloolefin monomers containing the specific monomer (2) in the above amount are used, a cycloolefin addition copolymer containing a hydrolyzable silyl group is obtained, and when the resulting addition copolymer is processed into a crosslinked film, the film has excellent solvent resistance, excellent chemical resistance, small heat shrinkage and adhesion properties, so that the above amount is preferable. If the amount of the specific monomer (2) exceeds 30% by mol in the whole amount of all the cycloolefin monomers, lowering of polymerization activity sometimes takes place, or increase of water absorption of the resulting addition polymer sometimes takes place to cause water absorption distortion.

If a compound having an alkyl group of 3 to 15 carbon atoms or an alkenyl group is used as the specific monomer (1), a crosslinked product obtained by crosslinking the resulting polymer or by crosslinking a hydrogenation product that is obtained by hydrogenating olefinic unsaturated bonds of the resulting polymer tends to have a large coefficient of linear expansion, and in the uses requiring strict heat distortion, this sometimes becomes a problem.

In the present invention, a monomer copolymerizable with the specific monomer (1) or (2) (referred to as a "copolymerizable monomer" hereinafter) can be used in combination. Examples of the copolymerizable monomers include cycloolefins, such as copolypentene, cyclohexene, cycloheptene and cyclooctene; cyclodiolefins, such as cyclopentadiene and cyclohexadiene; and alky substituted derivatives thereof. Although the amount of such a monomer is appropriately selected according to the properties required for the resulting polymer, it is in the range of usually 0 to 50% by mol, preferably 0 to 20% by mol, based on the whole amount of all the monomers.

When the cyclodiolefin is used, it is preferable to hydrogenate olefinic unsaturated bonds remaining after polymerization in order to prevent coloring of the resulting polymer attributable to heat or light. A higher degree of hydrogenation is preferable, and the degree of hydrogenation is usually not less than 90%.

In the present invention, it is preferable that the cycloolefin monomers contain no other monomer than the specific monomer (1) and the specific monomer (2), though it is not specifically restricted.

Production of Cycloolefin Addition Polymer Addition Polymerization

In the production process of the invention, the monomers described above are addition-polymerized in the presence of the multi-component catalyst consisting of the aforesaid components.

In the present invention, a specific olefin compound can be used in combination with the multi-component catalyst consisting of the aforesaid components, and by the use of the specific olefin compound in combination, enhancement of polymerization activity can be expected. Examples of such specific olefin compounds include ethylene, vinyl chloride, vinyl acetate and acrylic ester. Of these, ethylene is preferable. The specific olefin compound can be used in an amount of 1 to 10,000 mol based on 1 gram atom of Pd of the palladium compound (a).

The addition polymerization in the invention is carried out usually in a polymerization solvent. Examples of the solvents employable for the addition polymerization in the invention include alicyclic hydrocarbon solvents, such as cyclohexane, cyclopentane and methylcyclopentane; aliphatic hydrocarbon solvents, such as hexane, heptane and octane; aromatic hydrocarbon solvents, such as toluene, benzene, xylene, ethylbenzene and mesitylene; and halogenated hydrocarbon solvents, such as dichloromethane, 1,2-dichoroethane, 1,1-dichloroethane, tetrachloroethane, chlorobenzene and dichlorobenzene. It is preferable to use a non-halogen type solvent from the viewpoint of environmental protection. In the present invention, the above solvents may be used singly, or a mixed solvent of two or more kinds of the above solvents may be used.

In the addition polymerization in the invention, the polymerization temperature is in the range of usually −20 to 120° C., preferably 20 to 100° C., and the temperature can be changed with the process of polymerization.

In the present invention, the monomers may be added at once or may be added successively. When two or more monomers are used, the compositional distribution control of the resulting polymer can be carried out according to a difference in the copolymerization reactivity and a method for adding the monomers, and various copolymers of a random copolymer having no compositional distribution to a copolymer having a compositional distribution are obtainable. As the polymerization process, any of a batch polymerization process and a continuous polymerization process using a tank reactor, a column reactor, a tube reactor or the like is adoptable.

In the present invention, by the addition polymerization of the cycloolefin monomers comprising the specific monomer (1), a structural unit represented by the following formula (3) is formed. The structural unit represented by the formula (3) may be formed by further hydrogenating the resulting polymer after the addition polymerization, as described later.

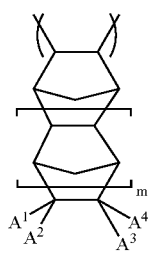

(3)

In the formula (3), $A^1$ to $A^4$ and m have the same meanings as those in the formula (1).

In the case where the cycloolefin monomers contain the specific monomer (2)-1 and/or the specific monomer (2)-2, the specific monomer (1) and the specific monomer (2) are addition-polymerized, whereby a structural unit represented by the following formula (4)-1 or (4)-2 is formed in addition to the structural unit represented by the formula (3).

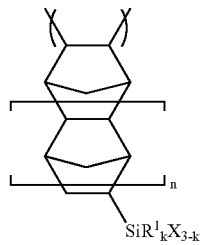

(4)-1

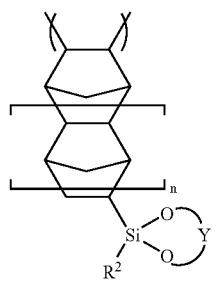

(4)-2

In the formulas (4)-1 and (4)-2, $R^1$, $R^2$, X, Y, k and n have the same meanings as those in the formulas (2)-1 and (2)-2.

In the present invention, termination of the addition polymerization is carried out by adding a compound selected from organic carboxylic acid compounds, alcohol compounds, primary to tertiary amine compounds, hydroxylamine compounds, ammonia, hydrogen, allyl halide compounds, methylaryl halide compounds, tertiary alkyl halide compounds, acyl halide compounds, silane compounds having Si—H bond, etc. to the polymer solution.

In the present invention, control of a molecular weight of the cycloolefin addition polymer is carried out by the use of olefins, such as ethylene, propylene, 1-butene and 1-hexene, trimethylsilylethylene, trimethoxyethylene, triethoxyethylene, styrene, cyclopentene, cyclohexadiene, silane compounds, such as triethylsilane, diethylsilane, phenylsilane and diphenylsilane, isopropanol, water, hydrogen, etc., and of these, ethylene is preferable because control of the molecular weight can be made by the use of a small amount and ethylene has no influence on the polymerization activity.

Hydrogenation

In the case where olefinic unsaturated bonds are present in the addition polymer obtained, e.g., a case where the specific monomer (1) having olefinic unsaturated bonds as a side chain substituent is used, the olefinic unsaturated bonds cause coloring due to heat or light or deterioration such as gelation, so that it is preferable to hydrogenate the olefinic unsaturated bonds. A higher degree of hydrogenation is preferable, and the degree of hydrogenation is desired to be usually not less than 90%, preferably not less than 95%, more preferably not less than 99%.

The hydrogenation method is not specifically restricted, and a usual method to hydrogenate olefinic unsaturated bonds can be applied. In general, hydrogenation is carried out in an inert solvent in the presence of a hydrogenation catalyst at a hydrogen gas pressure of 0.5 to 15 MPa and a reaction temperature of 0 to 200° C. When aromatic rings (aromatic groups) are present in the polymer, the aromatic rings are relatively stable to heat or light and sometimes contribute to optical properties or heat resistance, so that the aromatic rings do not necessarily have to be hydrogenated. Depending upon the desired properties, it is necessary to select conditions under which the aromatic rings are not substantially hydrogenated.

Examples of the inert solvents employable for the hydrogenation reaction include aliphatic hydrocarbons of 5 to 14 carbon atoms, such as hexane, heptane, octane and dodecane, and alicyclic hydrocarbons of 5 to 14 carbon atoms, such as cyclohexane, cycloheptane, cyclodecane and methylcyclohexane. When hydrogenation is carried out under such conditions that the aromatic rings are not hydrogenated, aromatic hydrocarbons of 6 to 14 carbon atoms, such as benzene, toluene, xylene and ethylbenzene, are also employable.

Examples of the hydrogenation catalysts include solid catalysts in which the group VIII metals, such as nickel, palladium, platinum, ruthenium and rhodium, or compounds thereof are supported on porous carriers, such as carbon, alumina, silica, silica alumina and diatomaceous earth, and homogeneous catalysts, e.g., organic carboxylates of the group IV to the group VIII metals, such as cobalt, nickel and palladium, combinations of β-diketone compounds and organoaluminum or organolithium, and complexes of ruthenium, rhodium or iridium.

Decatalyst

In the production process of the invention, the catalyst used for the polymerization reaction and the catalyst used for the hydrogenation reaction that is optionally performed are preferably removed in a decatalyst step. The method applied to the decatalyst step is not specifically restricted and appropriately selected according the properties or the shapes of the catalysts used.

In the present invention, the decatalyst operation is carried out by treating a solution of the polymer obtained after termination of the polymerization or a solution of a hydrogenation product of the polymer with an aqueous solution of an oxycarboxylic acid, such as lactic acid, glycolic acid, β-methyl-β-oxypropionic acid or γ-oxybutyric acid, or an aqueous solution of triethanolamine, dialkylethanolamine, ethylenediaminetetraacetate or the like, or treating the solution with an adsorbent, such as diatomaceous earth, silica, alumina or activated carbon.

Further, from the solution from which the catalysts have been removed, the solvent is directly removed by evaporation, or the resulting polymer is solidified by the use of alcohols, such as methanol, ethanol and propanol, or ketones, such as acetone and methyl ethyl ketone, and then dried, whereby the desired cycloolefin addition polymer is obtained.

Recovery

In the production process of the invention, the cycloolefin addition polymer produced through the steps of polymerization, decatalyst, etc. can be recovered by publicly known methods, such as a method of directly removing a solvent from the solution containing the polymer by means of heating, pressure reduction or the like and a method of mixing the solution containing the polymer with a poor solvent for the polymer, such as alcohol or ketone, to solidify and separate the polymer. The polymer can be recovered also by using the solution as such as a raw material and processing it into a film or a sheet by a solution casting method (casting method).

Cycloolefin Addition Polymer

The glass transition temperature (Tg) of the cycloolefin addition polymer obtained by the production process of the invention is determined according to the types and the amounts of the monomers used for the polymerization, and has only to be properly selected according to the use application of the polymer. The glass transition temperature of the polymer is in the range of usually 150 to 450° C., preferably 180 to 400° C., more preferably 200 to 380° C. If the glass transition temperature of the polymer is lower than 150° C., a problem of heat resistance sometimes takes place. On the other hand, if the glass transition temperature exceeds 450° C., the polymer becomes too rigid to thereby lower toughness, and as a result, the polymer is liable to be broken.

In the present invention, the glass transition temperature of the cycloolefin addition polymer is determined as a peak temperature of temperature dispersion of Tan δ that is measured as a dynamic viscoelasticity (storage elastic modulus: E', loss elastic modulus: E", Tan δ=E"/E')

In the present invention, the molecular weight of the cycloolefin addition polymer is measured by gel permeation chromatography at 120° C. using o-dichlorobenzene as a solvent. The cycloolefin addition polymer has a number-average molecular weight (Mn), in terms of polystyrene, of 10,000 to 300,000 and a weight-average molecular weight (Mw), in terms of polystyrene, of 30,000 to 500,000, and preferably has a number-average molecular weight (Mn) of 30,000 to 200,000 and a weight-average molecular weight (Mw) of 50,000 to 300,000.

If the cycloolefin addition polymer has a number-average molecular weight (Mn) of less than 10,000 and a weight-average molecular weight (Mw) of less than 30,000, a film or a sheet formed from the polymer is liable to be broken. If the cycloolefin addition polymer has a number-average molecular weight (Mn) exceeding 300,000 and a weight-average molecular weight (Mw) exceeding 500,000, the solution viscosity of the polymer becomes too high and handling of the polymer solution sometimes becomes difficult when a film or a sheet is formed by casting (solution casting).

To the cycloolefin addition polymer in the invention, an antioxidant selected from antioxidants of phenol type, phosphorus type, thioether type and lactone type can be added in an amount of 0.001 to 5 parts by weight, preferably 0.01 to 5 parts by weight, based on 100 parts by weight of the polymer, whereby heat deterioration can be further improved.

In order to improve processability or mechanical properties such as toughness, to the cycloolefin addition polymer in the invention can be further added another cycloolefin addition polymer, a hydrogenated cycloolefin ring-open polymer, an addition copolymer of α-olefin and cycloolefin, a crystalline α-olefin polymer, an α-olefin copolymer of rubber-like ethylene and α-olefin of 3 or more carbon atoms, a hydrogenated butadiene polymer, a hydrogenated butadiene/styrene block copolymer, a hydrogenated isoprene polymer or the like in an amount of 0.1 to 90% by weight.

The cycloolefin addition polymer in the invention may be subjected to crosslinking. The crosslinking can be carried out by solution-casting the polymer solution or dispersion containing an acid generator as described above and then subjecting it to external heating or light irradiation before, during or after the drying step in the aforesaid film- or sheet-forming process.

In the case where the cycloolefin addition polymer in the invention has a hydrolyzable silyl group or an oxetane group in at least a part of a structural unit, a crosslinked cycloolefin addition polymer can be obtained by adding a compound (acid generator) that generates an acid by the action of heat or light to the polymer and subjecting the polymer to light irradiation or heating.

The cycloolefin addition polymer having the aforesaid structural unit (4)-1 or (4)-2 (referred to as a "hydrolyzable silyl group-containing polymer" hereinafter) obtained by the production process of the invention has a hydrolyzable silyl group as a side chain substituent, and hence, by performing hydrolysis and condensation in the presence of an acid, a polymer crosslinked with a siloxane bond can be obtained. When the crosslinked product is processed into a film or a sheet, the film or the sheet has an extremely decreased coefficient of linear expansion and also has excellent solvent resistance, chemical resistance and liquid crystal resistance.

In the present invention, the crosslinked product can be obtained by adding a compound (acid generator) that generates an acid by the action of heat or light to a solution of the hydrolyzable silyl group-containing polymer, forming a film or a sheet by solution casting (casting), and subjecting the film or the sheet to light irradiation or heating to generate an acid and thereby promote crosslinking.

The acid generator for use in the invention is a compound selected from the following groups (1), (2), (3) and (4), and at least one compound selected from them is desirably used in an amount of 0.0001 to 5 parts by weight, preferably 0.001 to 5 parts by weight, based on 100 parts by weight of the hydrolyzable silyl group-containing polymer.

(1) Compounds which generate Brensted acid or Lewis acid by light irradiation, e.g., onium salts which are diazonium salts, ammonium salts, iodonium salts, sulfonium salts or phosphonium salts, each having no substituent or having alkyl group, aryl group or heterocyclic group and having, as counter anion, sulfonic acid, boron acid, phosphoric acid, antimonic acid or carboxylic acid; halogenated organic compounds, such as halogen-containing oxadiazole, a halogen-containing triazine compound, a halogen-containing acetophenone compound and a halogen-containing benzophenone compound; quinonediazide compounds, such as 1,2-benzoquinonediazido-4-sulfonic acid ester, 1,2-naphthoquinonediazido-4-sulfonic acid ester; and diazomethane compounds, such as $\alpha,\alpha'$-bis(sulfonyl)diazomethane and $\alpha$-carbonyl-$\alpha'$-sulfonyldiazomethane.

(2) Compounds which generate an acid by heating to a temperature of not lower than 50° C., e.g., aromatic sulfonium salts, aromatic ammonium salts, aromatic pyridinium salts, aromatic phosphonium salts, aromatic iodonium salts, hydrazinium salts, and iron salts of metallocene, each having counter anion selected from $BF_4$, $PF_6$, $AsF_6$, $SbF_6$, $B(C_6F_5)_4$ and the like.

(3) Compounds which generate an acid by heating to a temperature of not lower than 50° C. in the presence or absence of water, e.g., trialkylphosphorous acid ester, triarylphosphorous acid ester, dialkylphosphorous acid ester, monoalkylphosphorous acid ester, hypophosphorous acid ester, secondary or tertiary alcohol ester of organic carboxylic acid, hemiacetal ester of organic carboxylic acid, trialkylsilyl ester of organic carboxylic acid, and an ester compound of organic sulfonic acid and secondary or tertiary alcohol.

(4) Oxides of metals, such as tin, aluminum, zinc, titanium and antimony, alkoxide compounds thereof, phenoxide compounds thereof, $\beta$-diketone compounds thereof, alkyl compounds thereof, halide compounds thereof, and organic acid salt compounds thereof.

Of these, the compounds selected from the groups (1), (2) and (3) are preferable, and the compounds of the group (3) are particularly preferable because they have excellent compatibility with the hydrolyzable silyl group-containing polymer and exhibit excellent storage stability when they are added to the solution containing the hydrolyzable silyl group-containing polymer. The above acid generators may be used singly, or may be used in combination of two or more kinds.

The method for forming the cycloolefin addition polymer of the invention or a composition containing the polymer is not specifically restricted, but for example, the cycloolefin polymer or a composition containing the polymer can be formed into a film, a sheet or a thin film by a solution casting method comprising dissolving or dispersing the cycloolefin polymer or a composition containing the polymer, applying the solution or the dispersion onto a substrate and then drying it to remove the solvent. The solution casting method is preferable because production of a polymer due to heat history can be inhibited.

The solution casting method for forming a film, a sheet or a thin film is more specifically a method comprising casting a polymer solution having been adjusted to a desired concentration and having been optionally subjected to filtration and defoaming on a release plate that flows on a roll, passing the solution between the casting roll and a smoothing roll that is in contact with the casting roll to adjust the thickness and to smooth the surface, then evaporating the solvent, taking away the release plate and passing the film or the like through a drying machine. When there is strict requirement for the residual solvent, it is effective to perform, in addition to the primary drying using a drying machine, secondary drying comprising immersion in a low-boiling halogen solvent, such as methylene chloride or 1,2-dichloroethane, or exposure to an atmosphere of vapor of the low-boiling halogen solvent, or contact with water vapor, and then heating at a temperature of 80 to 220° C.

Crosslinking of the film, the sheet or the thin film is carried out by solution-casting the polymer solution or dispersion containing an acid generator as described above and then subjecting it to external heating or light irradiation before, during or after the drying step.

The content of the residual solvent in the film, the sheet or the thin film obtained by the above method is not more than 5,000 ppm, preferably not more than 2,000 ppm, more preferably not more than 1,000 ppm. If the content of the residual solvent exceeds 5,000 ppm, a large amount of a volatile component is generated to cause contamination of equipments or lowering of degree of pressure reduction when a surface treatment, such as deposition or sputtering, of the film, the sheet or the thin film is carried out in a reduced pressure system, and moreover, the film, the sheet or the thin film has an increased coefficient of linear expansion and sometimes has poor dimensional stability.

The cycloolefin addition polymer of the invention is preferably processed or formed by the solution casting as described above, but melt molding, such as injection molding, melt extrusion molding or blow molding, is also applicable so long as the glass transition temperature of the polymer is not higher than 250° C. Further, even if the glass transition temperature of the polymer exceeds 250° C., the polymer can be formed into a sheet, a film or a thin film through melt extrusion molding or blow molding by adding a plasticizer or allowing the polymer to swell with a solvent.

In order to further improve resistance to oxidation deterioration or resistance to coloring deterioration of the cycloolefin addition polymer of the invention, a compound selected from phenolic antioxidants, lactone antioxidants, phosphorus antioxidants and thioether antioxidants can be added in an amount of 0.001 to 5 parts by weight based on 100 parts by weight of the polymer.

In order to improve processability or mechanical properties such as toughness, to the cycloolefin addition polymer of the invention can be added another cycloolefin addition polymer, a hydrogenated cycloolefin ring-open polymer, an addition copolymer of α-olefin and cycloolefin, a crystalline α-olefin polymer, an α-olefin copolymer of rubber-like ethylene and α-olefin of 3 or more carbon atoms, a hydrogenated butadiene polymer, a hydrogenated butadiene/styrene block copolymer, a hydrogenated isoprene polymer or the like in an amount of 0.1 to 90% by weight.

The cycloolefin addition polymer obtained by the production process of the invention can be employed not only for optical material parts but also for electronic/electric parts, medical equipment materials, electrical insulating materials and packaging materials.

Examples of the optical materials for which the cycloolefin addition polymer is employable include light guide plates, protective films, deflection films, phase difference films, touch panels, transparent electrode substrates, optical recording substrates, such as CD, MD and DVD, substrates for TFT, color filter substrates, optical lenses and sealing materials. Examples of the electronic/electric parts for which the cycloolefin addition polymer is employable include containers, trays, carrier tapes, separation films, cleaning containers, pipes and tubes. Examples of the medical equipment materials for which the cycloolefin addition polymer is employable include medicine containers, ampoules, syringes, infusion fluid bags, sample containers, test tubes, blood-collecting tubes, sterilizing containers, pipes and tubes. Examples of the electrical insulating materials for which the cycloolefin addition polymer is employable include coating materials of electrical wires and cables, insulating materials of OA machines such as computer, printer and copy machine, and insulating materials of printed boards. Examples of the packaging materials for which the cycloolefin addition polymer is employable include packaging films for foods and medicines.

According to the present invention, cycloolefin compounds can be addition-(co)polymerized with high polymerization activity by the use of a small amount of a palladium catalyst, and a cycloolefin addition polymer can be produced with high productivity.

According to the present invention, further, especially when cycloolefin monomers are polymerized using a multi-component catalyst comprising (a) a palladium compound, (b-1) a specific phosphonium salt and (d) an organoaluminum compound, a cycloolefin addition polymer having substantially no compositional distribution is obtained.

According to the present invention, furthermore, especially when cycloolefin monomers are polymerized using a multi-component catalyst comprising (a) a palladium compound, (b-2) an addition complex of a specific phosphine compound and an organoaluminum compound and (c) an ionic boron compound or the like, addition (co)polymerization of the cycloolefin compounds can be carried out with high polymerization activity, and a cycloolefin addition polymer can be produced with high productivity. Moreover, even when a trace amount of oxygen is present in the polymerization system, influence on the polymerization activity is small, and even when a monomer composition containing a cycloolefin compound having a polar group, particularly a hydrolyzable silyl group, is copolymerized, addition copolymerization can be carried out with high polymerization activity.

EXAMPLES

The present invention is further described with reference to the following examples, but it should be construed that the invention is in no way limited to those examples.

In the following examples, molecular weight, total light transmittance, glass transition temperature, tensile strength/elongation, and randomness in the copolymerization reaction are measured or evaluated by the methods described below.

(1) Molecular Weight

The molecular weight was measured at 120° C. by means of a WATERS 150C Model gel permeation chromatography (GPC) apparatus using a TOSOH H type column and using o-dichlorobenzene as a solvent. The resulting molecular weight is a value in terms of standard polystyrene.

(2) Total Light Transmittance

A film having a thickness of about 150 μm was formed, and a total light transmittance of the film was measured in accordance with ASTM-D1003.

(3) Glass Transition Temperature

The glass transition temperature was determined as a peak temperature of temperature dispersion of Tan δ (ratio of a loss elastic modulus E" to a storage elastic modulus E', Tan δ=E"/E') that is measured as a dynamic viscoelasticity. In the measurement of the dynamic viscoelasticity, a peak temperature of Tan δ was measured using Rheovibron DDV-01FP (manufactured by Orientec Co., Ltd.) and using a member having a measuring frequency of 10 Hz, a heating rate of 4° C./min, a vibration excitation mode of a single wave form and a vibration excitation amplitude of 2.5 μm.

(4) Coefficient of Linear Expansion

A piece of a film having a test shape of about 150 μm thickness, 10 mm length and 10 mm width was fixed upright in TMA (Thermal Mechanical Analysis) SS6100 (manufactured by Seiko Instruments Inc.). To the film, a load of 1 g was applied by means of a probe, and in order to remove heat history of the film, the temperature was temporarily raised up to 200° C. from room temperature at a rate of 5° C./min. Then, the temperature was again raised from room temperature at a rate of 5° C./min, and from an inclination of extension of the film between 50° C. and 150° C., a coefficient of linear expansion was determined.

(5) Tensile Strength/Elongation

The tensile strength and elongation of a test specimen were measured at a pulling rate of 3 mm/min in accordance with JIS-K7113.

(6) Amount of Residual Solvent

A sample was placed in a hot air oven at 200° C. for 3 hours, and from a change in weight of the sample between before and after placing the sample in the oven, an amount of the residual solvent was determined.

(7) Compositional Analysis of Polymer in Copolymerization Reaction

Copolymerization reaction of the "specific monomer (1)" with the "specific monomer (2)" was carried out, and the polymerization was terminated using isopropyl alcohol when the conversion of the monomers to a polymer was not higher than 20%. Then, an alkoxysilyl group, an ester group and an oxetane group in the resulting polymer were measured by a $^1$H-NMR (solvent: $C_6D_5$) apparatus of 270 MHz to determine contents of those groups in the resulting polymer.

Regarding the methoxy group, absorption ($CH_3$ of $SiOCH_3$) at 3.5 ppm was used, and regarding the ethoxy group, absorption ($CH_2$ of $SiOCH_2CH_3$) at 3.9 ppm was used. Regarding the methyl ester group, absorption (—C(O)OCH$_3$) at 3.5 ppm was used, and regarding the ethyl ester group, absorption ($CH_2$ of —C(O)OCH$_2$CH$_3$) at 3.9 ppm was used. Regarding the oxetanyl group, absorption ($CH_2$ adjacent to O atom of 4-member ring) at 4.2-4.6 ppm was used.

When property absorptions of $^1$H-NMR overlapped, the residual monomer in the polymer solution was analyzed by a gas chromatogram to determine the amount introduced into the copolymer.

As an indication of randomness, a ratio (r) of a proportion ($R_p$) of structural units derived from the "specific monomer (2)" in the polymer to a proportion ($R_m$) of the "specific monomer (2)" in all of the monomers was calculated.

$$r=R_p/R_m$$

As r comes near to 1, the randomness becomes better.

As r is farther away from 1 under the condition of r<1 or r>1, the randomness becomes worse.

Example 1

A 100 ml glass pressure bottle was charged with 30.7 g of dehydrated toluene having a water content of 6 ppm, 30.7 g of cyclohexane, 79 g (7.0 mmol) of 5-triethoxysilylbicyclo[2.2.1]hept-2-ene and 8.75 g (93 mmol) of bicyclo[2.2.1]hept-2-ene, and the charge opening was sealed with a crown rubber cap. Then, 30 ml of ethylene in the form of a gas was fed to the pressure bottle through the rubber cap.

The pressure bottle containing the solvent and the monomers was heated to 75° C., and palladium 2-ethylhexanoate (0.00133 mg atom in terms of Pd atom), 0.00133 mmol of tricylohexylphosphonium pentafluorophenylborate and 0.00667 mmol of triethylaluminum were added in this order to initiate polymerization.

After 15 minutes from the initiation of polymerization, a part of the polymer solution was sampled from the polymerization system. From the solid content in the polymer solution sample, a conversion of the monomers to the polymer was determined, and from $^1$H-NMR of 270 MHz, a proportion of structural units derived from the 5-triethoxysilylbicyclo[2.2.1]hept-2-ene in the polymer was determined. The conversion was 19%, the proportion of structural units derived from the 5-triethoxysilylbicyclo[2.2.1]hept-2-ene in the polymer was 11% by mol, and the indication r of randomness was 1.6.

Although the polymerization reaction was carried out at 75° C. for 3 hours, the polymer solution did not become turbid and was transparent. To the solution was added 1 ml of dimethylaminoethanol to terminate the polymerization. From the measurement of a solid content in the polymer solution, the conversion to the polymer proved to be 96%.

Operation of extraction removal of a catalyst residue from the polymer solution by the use of isopropanol containing lactic acid water was carried out twice, and the polymer solution was introduced into 2 liters of isopropanol to solidify a polymer. After the solidification, the polymer was dried at 80° C. for 17 hours under reduced pressure to obtain a polymer A.

A proportion of structural units derived from the 5-triethoxysilylbicyclo[2.2.1]hept-2-ene in the polymer A was determined from $^1$H-NMR of 270 MHz. The proportion of structural units derived from the 5-triethoxysilylbicyclo[2.2.1]hept-2-ene was 6.7% by mol. The polymer had a number-average molecular weight (Mn) of 74,000, a weight-average molecular weight (Mw) of 185,000 and a glass transition temperature (Tg) of 360° C.

Example 2

Polymerization was carried out in the same manner as in Example 1, except that 0.00133 mmol of tricyclohexylphosphonium-2-ethylhexanoate and 0.00133 mmol of triphenylcarbenium tetrakis(pentafluorophenyl)borate were used instead of 0.00133 mmol of tricyclohexylphosphonium pentafluorophenylborate.

The conversion after 12 minutes from the initiation of polymerization was 18%, and the proportion of structural units derived from the 5-triethoxysilylbicyclo[2.2.1]hept-2-ene in the polymer was 12% by mol. The polymerization system did not become turbid until the polymerization of 3 hours was completed, and the conversion to the polymer was 97%.

The polymer B obtained as above had a number-average molecular weight (Mn) of 63,000, a weight-average molecular weight (Mw) of 167,000 and a glass transition temperature (Tg) of 365° C. The proportion of structural units derived from the 5-triethoxysilylbicyclo[2.2.1]hept-2-ene in the polymer B was 6.8% by mol, and the indication r of randomness was 1.7.

Example 3

Polymerization was carried out in the same manner as in Example 1, except that 90 mmol of bicyclo[2.2.1]hept-2-ene and 10 mmol of 5-trimethoxysilylbicyclo[2.2.1]hept-2-ene were used instead of 93 mmol of bicyclo[2.2.1]hept-2-ene and 7 mmol of 5-triethoxysilylbicyclo[2.2.1]hept-2-ene.

The conversion after 15 minutes from the initiation of polymerization was 18%, and the proportion of structural units derived from the 5-trimethoxysilylbicyclo[2.2.1]hept-2-ene in the polymer was 15% by mol. The polymerization system did not become turbid until the polymerization of 3 hours was completed, and the conversion to the polymer was 95%.

The polymer C obtained as above had a number-average molecular weight (Mn) of 72,000, a weight-average molecular weight (Mw) of 177,000 and a glass transition temperature (Tg) of 360° C. The proportion of structural units derived from the 5-trimethoxysilylbicyclo[2.2.1]hept-2-ene in the polymer C was 9.7% by mol, and the indication r of randomness was 1.5.

Example 4

Polymerization was carried out in the same manner as in Example 3, except that 10 mmol of methyl 4-methyltetracyclo[6.2.1.1$^{3,6}$.0$^{2,7}$]dodec-9-ene-4-carboxylate was used instead of 10 mmol of 5-trimethoxysilylbicyclo[2.2.1]hept-2-ene.

The conversion after 20 minutes from the initiation of polymerization was 19%, and the proportion of structural units derived from the methyl 4-methyltetracyclo[6.2.1.1$^{3,6}$.0$^{2,7}$]dodec-9-ene-4-carboxylate in the polymer was 6% by mol. The polymerization system did not become turbid until the polymerization of 3 hours was completed, and the conversion to the polymer was 91%.

The polymer D obtained as above had a number-average molecular weight (Mn) of 62,000, a weight-average molecular weight (Mw) of 156,000 and a glass transition temperature (Tg) of 360° C. The proportion of structural units derived from the methyl 4-methyltetracyclo[6.2.1.1$^{3,6}$.0$^{2,7}$] dodec-9-ene-4-carboxylate in the polymer D was 9.2% by mol, and the indication r of randomness was 0.6.

Example 5

Polymerization was carried out in the same manner as in Example 2, except that 80 mmol of bicyclo[2.2.1]hept-2-ene and 20 mmol of tricyclo[5.2.1.0$^{2,6}$]dec-8-ene in which a proportion of the endo form was 95% were used as monomers. From the analysis by a gas chromatogram of the residual monomers in the polymer solution, the proportion of structural units derived from the tricyclo[5.2.1.0$^{2,6}$]dec-8-ene in the polymer proved to be 12% by mol. The copolymer solution did not become turbid until the polymerization of 3 hours was completed, and the conversion to the polymer was 92%.

The polymer E obtained as above had a number-average molecular weight (Mn) of 64,000, a weight-average molecular weight (Mw) of 177,000 and a glass transition temperature (Tg) of 365° C.

Comparative Example 1

Polymerization was attempted in the same manner as in Example 1, except that tricyclophosphine was used instead of the tricyclohexylphosphonium pentafluorophenylborate, but polymerization reaction did not take place.

Comparative Example 2

Polymerization was carried out in the same manner as in Example 2, except that tricyclohexylphosphine was used instead of the tricyclohexylphosphonium-2-ethyl-hexanoate.

The conversion after 12 minutes from the initiation of polymerization was 18%, and the proportion of structural units derived from the 5-triethoxysilylbicyclo[2.2.1]hept-2-ene in the polymer was 17% by mol. After 1 hour, the polymerization system began to become turbid, and after 3 hours, the polymerization system was turbid and a gel-like polymer was precipitated. The conversion to the polymer was 90%.

The polymer F obtained as above was soluble in p-chlorobenzene and o-dichlorobenzene. The polymer F had a number-average molecular weight (Mn) of 53,000, a weight-average molecular weight (Mw) of 187,000 and a glass transition temperature (Tg) of 365° C. The proportion of structural units derived from the 5-triethoxysilylbicyclo [2.2.1]hept-2-ene in the polymer F was 6.8% by mol, and the indication r of randomness was 2.4.

Reference Example 1

In a mixed solvent of 10 ml of methylcyclohexane and 40 ml of xylene, 10 g of the polymer. A was dissolved. To the resulting solution, pentaerythrityl-tetrakis[3-(3,5-di-t-butyl-4-hydroxyphenyl)propionate] and tris(2,4-di-t-butylphenyl) phosphite were added as antioxidants in an each amount of 0.6 part by weight based on 100 parts by weight of the polymer, and tributyl phosphite was added as a crosslinking agent in an amount of 1.4 parts by weight based on 100 parts by weight of the polymer.

The polymer solution was filtered through a membrane filter having a pore diameter of 10 μm to remove foreign matters and then cast on a polyester film at 25° C. The ambient temperature was slowly raised up to 50° C. to remove the mixed solvent, whereby a film was formed.

After the amount of the residual solvent in the film became 5 to 10% by weight, the film was exposed to steam at 180° C. for 2 hours to prepare a crosslinked film. Then, the film was exposed to a methylene chloride vapor atmosphere at 25° C. for 30 minutes to remove the residual solvent. Thereafter, the film was vacuum dried at 80° C. for 30 minutes to remove methylene chloride to form a crosslinked film A-1 having a thickness of 150 μm. The amount of the residual solvent in the resulting film A-1 was not more than 0.3% by weight. The evaluation results are set forth in Table 1.

Reference Example 2

A crosslinked film B-1 having a thickness of 150 μm was obtained in the same manner as in Reference Example 1, except that the polymer B was used instead of the polymer A. The amount of the residual solvent in the resulting film B-1 was not more than 0.3% by weight. The evaluation results are set forth in Table 1.

Reference Example 3

A crosslinked film C-1 having a thickness of 150 μm was obtained in the same manner as in Reference Example 1, except that the polymer C was used instead of the polymer A. The amount of the residual solvent in the resulting film C-1 was not more than 0.3% by weight. The evaluation results are set forth in Table 1.

Reference Example 4

Film formation was carried out in the same manner as in Reference Example 1, except that the polymer D was used instead of the polymer A. As a result, a partially crosslinked film D-1 having a thickness of 150 μm was obtained. The amount of the residual solvent in the resulting film D-1 was not more than 0.3% by weight. The evaluation results are set forth in Table 1.

Comparative Reference Example 1

Film formation was carried out in the same manner as in Reference Example 1, except that the polymer E was used instead of the polymer A. As a result, a film E-1 having a thickness of 150 μm was obtained. The amount of the residual solvent in the resulting film E-1 was not more than 0.3% by weight. The evaluation results are set forth in Table 1. Because any hydrolyzable silyl group participating in crosslinking was not present in the polymer E, it is thought that the resulting film E-1 was not crosslinked.

Comparative Reference Example 2

A crosslinked film F-1 having a thickness of 150 μm was obtained in the same manner as in Reference Example 1, except that the polymer F was used instead of the polymer A and the cast solvent was replaced with p-chlorobenzene.

The amount of the residual solvent in the resulting film F-1 was not more than 0.3% by weight. The evaluation results are set forth in Table 1.

TABLE 1

| | Film No. | Total light transmittance (%) | Tensile strength (MPa) | Elongation (%) | Coefficient of linear expansion (ppm/° C.) |
|---|---|---|---|---|---|
| Ref. Ex. 1 | A-1 | 91 | 61 | 6.5 | 41 |
| Ref. Ex. 2 | B-1 | 91 | 60 | 6.3 | 41 |
| Ref. Ex. 3 | C-1 | 91 | 62 | 6.0 | 40 |
| Ref. Ex. 4 | D-1 | 91 | 61 | 6.2 | 40 |
| Comp. Ref. Ex. 1 | E-1 | 91 | 55 | 6.8 | 53 |
| Comp. Ref. Ex. 2 | F-1 | 88 | 56 | 5.2 | 45 |

Reference Example 5

In a 50 ml flask, 1.0 g of (3.57 mmol) of tricyclohexylphosphine was dissolved in 10 ml of deuterated benzene in a nitrogen atmosphere to prepare a solution of 0.357 mmol/ml.

A $^{31}$P-NMR (nuclear magnetic resonance) spectrum of the tricyclohexylphosphine was measured by a JASCO Corporation JEOL-270 Model nuclear magnetic resonance (NMR) apparatus using trimethyl phosphite (140 ppm) as an external standard.

As a result, an absorption spectrum of the tricyclohexylphosphine was observed at 9.2 ppm.

Reference Example 6

A part of the deuterated benzene solution of Reference Example 5 was withdrawn into a different flask, and air was fed in an amount of 1 mmol in terms of oxygen atom based on 1 mmol of the tricyclohexylphosphine to contact them at 25° C. for 2 days. A $^{31}$P-NMR spectrum of the tricyclohexylphosphine solution having been contacted with air was measured. As a result, there was no absorption spectrum of the tricyclohexylphosphine at 9.2 ppm, but an absorption spectrum of tricyclohexylphosphine oxide was newly observed at 45.7 ppm.

Reference Example 7

A part of the deuterated benzene solution of Reference Example 5 was withdrawn into a different flask, then triethylaluminum was added in an amount of 1 mmol based on 1 mmol of the tricyclohexylphosphine, and they were reacted at 25° C. for 30 minutes to synthesize an addition complex in the deuterated benzene.

A $^{31}$P-NMR spectrum of the complex solution of tricyclohexylphosphine and triethylaluminum having a molar ratio of 1:1 was measured. As a result, there was no absorption spectrum of the tricyclohexylphosphine at 9.2 ppm, but an absorption spectrum of an addition complex of tricyclohexylphosphine and triethylaluminum was newly observed at −4.0 ppm.

Reference Example 8

Contact with air was carried out in the same manner as in Reference Example 6, except that a complex of tricyclohexylphosphine and triethylaluminum having a molar ratio of 1:1 was used instead of the tricyclohexylphosphine.

Reference Example 9

An addition complex of cyclohexylphosphine and diethylaluminum chloride having a molar ratio of 1:1 was synthesized in the same manner as in Reference Example 7, except that diethylaluminum chloride was used instead of the triethylaluminum.

Example 6

A 100 ml glass pressure bottle was charged with 9.4 g of dehydrated toluene having a water content of 6 ppm, 37.6 g of cyclohexane having a water content of 5 ppm, 10 mmol of 9-trimethoxysilyltetracyclo[6.2.1.1$^{3,6}$.0$^{2,7}$]dodec-4-ene and 90 mmol of bicyclo[2.2.1]hept-2-ene in a nitrogen atmosphere, and the charge opening was sealed with a crown rubber cap. Then, 30 ml of ethylene of 0.1 MPa in the form of a gas was fed as a molecular weight modifier to the pressure bottle through the rubber cap.

The pressure bottle containing the solvent and the monomers was heated to 75° C., and 2×10$^{-4}$ mg atom (in terms of Pd atom) of palladium acetate, 2×10$^{-4}$ mmol of the addition complex of tricyclohexylphosphine and triethylaluminum having a molar ratio of 1:1 obtained in Reference Example 7 and 2.4×10$^{-4}$ mmol of triphenylcarbenium tetrakispentafluorophenylborate [Ph$_3$C.B(C$_6$F$_5$)$_4$] were added in this order to initiate polymerization.

Although the polymerization reaction was carried out at 75° C. for 3 hours, the polymer solution did not become turbid and was transparent. To the solution was added 0.1 mmol of triethylsilane to terminate the polymerization. From the measurement of a solid content in the polymer solution, the conversion to the polymer proved to be 95%.

Operation of extraction removal of a catalyst residue by adding 30 ml of water containing 1.0 mmol of triethanolamine to the polymer solution was carried out twice, and the polymer solution was introduced into 2 liters of isopropanol to solidify a polymer. After the solidification, the polymer was dried at 90° C. for 17 hours under reduced pressure to obtain a polymer G. The amounts of the residual metals in the polymer G were measured by atomic absorption analysis. As a result, the amount of the residual Pd atom was 0.5 ppm, and the amount of the residual Al atom was 1.5 ppm.

Further, a proportion of structural units derived from the 9-trimethoxysilyltetracyclo[6.2.1.1$^{3,6}$.0$^{2,7}$]dodec-4-ene in the polymer G was determined from $^1$H-NMR of 270 MHz. As a result, the proportion of structural units derived from the 9-trimethoxysilyltetracyclo[6.2.1.1$^{3,6}$.0$^{2,7}$]dodec-4-ene was 9.7% by mol. The polymer had a number-average molecular weight (Mn) of 74,000, a weight-average molecular weight (Mw) of 185,000 and a glass transition temperature (Tg) of 360° C.

Example 7

Polymerization was carried out in the same manner as in Example 6, except that the addition complex of Reference Example 8 that had been contacted with air was used instead of the addition complex of tricyclohexylphosphine and triethylaluminum obtained in Reference Example 7.

The conversion to the polymer was 97%.

The polymer H obtained as above had a number-average molecular weight (Mn) of 73,000, a weight-average molecular weight (Mw) of 187,000 and a glass transition temperature (Tg) of 365° C. The proportion of structural units derived from the 5-triethoxysilylbicyclo[2.2.1]hept-2-ene in the polymer H was 9.8% by mol.

Example 8

Polymerization was carried out in the same manner as in Example 6, except that subsequently to the addition of triphenylcarbenium tetrakispentafluorophenylborate [$Ph_3C.B(C_6F_5)_4$] as a catalyst component, $10 \times 10^{-4}$ mmol of triethylaluminum was added, and 10 mmol of 5-trimethoxysilylbicyclo[2.2.1]hept-2-ene was used instead of 10 mmol of 9-trimethoxysilyltetracyclo[$6.2.1.1^{3,6}.0^{2,7}$]dodec-4-ene in such a manner that addition of 5.0 mmol was carried out prior to the polymerization and thereafter addition of 1.0 mmol was carried out 5 times at intervals of 20 minutes.

The polymerization system did not become turbid until the polymerization of 3 hours was completed, and the conversion to the polymer was 98%.

The polymer I obtained as above had a number-average molecular weight (Mn) of 72,000, a weight-average molecular weight (Mw) of 177,000 and a glass transition temperature (Tg) of 360° C. The proportion of structural units derived from the 5-trimethoxysilylbicyclo[2.2.1]hept-2-ene in the polymer I was 9.7% by mol.

A 20 wt % p-xylene solution of the polymer I was prepared and subjected to solution casting (casting method). As a result, an optically transparent film was obtained. Further, a film to which cyclohexyl p-toluenesulfonate had been added was crosslinked using steam, and as a result, a transparent crosslinked film having excellent chemical resistance and solvent resistance was obtained.

Example 9

Polymerization was carried out in the same manner as in Example 6, except that 10 mmol of methyl 4-methyltetracyclo[$6.2.1.1^{3,6}.0^{2,7}$]dodec-9-ene-4-carboxylate was used instead of 10 mmol of 9-trimethoxysilyltetracyclo[$6.2.1.1^{3,6}.0^{2,7}$]dodec-4-ene.

The polymerization system did not become turbid until the polymerization of 3 hours was completed, and the conversion to the polymer was 91%.

The polymer J obtained as above had a number-average molecular weight (Mn) of 62,000, a weight-average molecular weight (Mw) of 156,000 and a glass transition temperature (Tg) of 360° C. The proportion of structural units derived from the methyl 4-methyltetracyclo[$6.2.1.1^{3,6}.0^{2,7}$]dodec-9-ene-4-carboxylate in the polymer J was 9.2% by mol.

Example 10

A 100 ml glass pressure bottle was charged with 37.6 g of cyclohexane as a solvent, 9.4 g of toluene as a solvent, 97 mmol of bicyclo[2.2.1]hept-2-ene as a monomer and also as a cycloolefin, 3 mmol of 9-trimethoxysilyltetracyclo [$6.2.1.1^{3,6}.0^{2,7}$]dodec-4-ene as a monomer and $10 \times 10^{-4}$ mmol of cycloocta-1,4-diene as a cyclic non-conjugated diene, and then further charged with $10 \times 10^{-4}$ mmol of triethylaluminum and $1.4 \times 10^{-4}$ mmol of tricyclohexylphosphine. Then, the charge opening was sealed with a crown rubber cap, and formation of an addition complex of triethylaluminum and cyclohexylphosphine was carried out at 30° C. for 10 minutes. Thereafter, 30 ml of ethylene of 0.1 MPa in the form of a gas was fed as a molecular weight modifier, and further, $2 \times 10^{-4}$ mmol (in terms of Pd atom) of palladium acetate and $2.4 \times 10^{-4}$ mmol of triphenylcarbenium tetrakispentafluorophenylborate [$Ph_3C.B(C_6F_5)_4$] were fed to initiate polymerization at 75° C.

The polymer solution after 3 hours from the initiation of polymerization was transparent, and the conversion to the polymer was 99%. The polymer was solidified by the use of isopropanol and then dried to obtain a polymer K.

The polymer K obtained as above had a number-average molecular weight (Mn) of 64,000 and a weight-average molecular weight (Mw) of 177,000. The proportion of structural units derived from the 9-trimethoxysilyltetracyclo [$6.2.1.1^{3,6}.0^{2,7}$]dodec-4-ene in the polymer K was 3.0% by mol, and the glass transition temperature (Tg) was 375° C.

Example 11

Polymerization was carried out in the same manner as in Example 6, except that 100 mmol of 5-n-hexylbicyclo[2.2.1] hept-2-ene (endo form/exo form ratio=20/80) was used as a monomer, $1.5 \times 10^{-4}$ mmol of the addition complex of tricyclohexylphosphine and diethylaluminum chloride having a molar ratio of 1:1 obtained in Reference Example 9 was used as a catalyst component instead of the addition complex of tricyclohexylphosphine and triethylaluminum having a molar ratio of 1:1.

The conversion to the polymer after 1.5 hours from the initiation of polymerization was 82%. The polymerization was terminated to obtain a polymer L.

The polymer solution was transparent, and a film obtained from a 20 wt % cyclohexane solution of the polymer L by solution casting was also transparent.

Example 12

A 100 ml glass pressure bottle was charged with 9.4 g of dehydrated toluene having a water content of 6 ppm, 37.6 g of cyclohexane having a water content of 5 ppm, 10 mmol of 9-trimethoxysilyltetracyclo[$6.2.1.1^{3,6}.0^{2,7}$]dodec-4-ene and 90 mmol of bicyclo[2.2.1]hept-2-ene in a nitrogen atmosphere, and the charge opening was sealed with a crown rubber cap. Then, 35 ml of ethylene in the form of a gas was fed to the pressure bottle through the rubber cap.

A catalyst previously prepared by aging $3 \times 10^{-4}$ mg atom (in terms of Pd atom) of palladium bis(acetylacetonate), $3 \times 10^{-4}$ mmol of the addition complex of tricyclohexylphosphine and triethylaluminum having a molar ratio of 1:1 obtained in Reference Example 7, $3.4 \times 10^{-4}$ mmol of triphenylcarbenium tetrakispentafluorophenylborate [$Ph_3C.B (C_6F_5)_4$] and $15 \times 10^{-4}$ mmol of bicyclo[2.2.1]hepta-2,5-diene in 2 ml of toluene as a solvent at 60° C. for 30 minutes was placed in the pressure bottle containing the solvent and the monomers and having been heated to 75° C., to initiate polymerization.

Although the polymerization reaction was carried out at 75° C. for 3 hours, the polymer solution did not become turbid and was transparent. To the solution was added 1 ml of dimethylaminoethanol to terminate the polymerization. From the measurement of a solid content in the polymer solution, the conversion to the polymer proved to be 92%.

The proportion of structural units derived from the 9-trimethoxysilyltetracyclo[$6.2.1.1^{3,6}.0^{2,7}$]dodec-4-ene in the resulting polymer M was 9.6% by mol The polymer M had a number-average molecular weight (Mn) of 48,000 and a weight-average molecular weight (Mw) of 235,000, and had a little wide molecular weight distribution.

Example 13

Polymerization was carried out in the same manner as in Example 6, except that after the addition of 30 ml of ethylene in the form of a gas, 30 ml of air was further added to the pressure bottle. The conversion to the polymer after 3 hours from the initiation of polymerization was 96%.

The proportion of structural units derived from the 9-trimethoxysilyltetracyclo[6.2.1.1$^{3,6}$.0$^{2,7}$]dodec-4-ene in the resulting polymer N was 9.8% by mol.

The polymer N had a number-average molecular weight (Mn) of 76,000 and a weight-average molecular weight (Mw) of 187,000.

In comparison with Example 6, it was found that addition of air to the polymerization system exerted no influenced on the polymerization activity and the molecular weight.

Comparative Example 3

Polymerization was carried out in the same manner as in Example 6, except that 2.0×10$^{-4}$ mmol of tricyclohexylphosphine was used instead of 2.0×10$^{-4}$ mmol of the addition complex of tricyclohexylphosphine and triethylaluminum having a molar ratio of 1:1.

The conversion to the polymer after 3 hours from the initiation of polymerization was 95%.

Comparative Example 4

Polymerization was carried out in the same manner as in Example 6, except that 2.0×10$^{-4}$ mmol of the tricyclohexylphosphine prepared in Reference Example 6, which had been contacted with air, was used instead of 2.0×10$^{-4}$ mmol of the addition complex of tricyclohexylphosphine and triethylaluminum having a molar ratio of 1:1.

The conversion to the polymer after 3 hours from the initiation of polymerization was 0%.

Comparative Example 5

Polymerization was carried out in the same manner as in Example 13, except that 2.0×10$^{-4}$ mmol of tricyclohexylphosphine was used instead of 2.0×10$^{-4}$ mmol of the addition complex of tricyclohexylphosphine and triethylaluminum having a molar ratio of 1:1.

The conversion to the polymer after 3 hours from the initiation of the polymerization was 65%, and the conversion to the polymer after 7 hours was 78%.

The proportion of structural units derived from the 9-trimethoxysilyltetracyclo[6.2.1.1$^{3,6}$.0$^{2,7}$]dodec-4-ene in the resulting polymer was 9.8% by mol. The polymer had a number-average molecular weight (Mn) of 56,000 and a weight-average molecular weight (Mw) of 137,000.

In comparison with Example 6 and Example 13, it was found that addition of air to the polymerization system caused lowering of polymerization activity and lowering of molecular weight.

INDUSTRIAL APPLICABILITY

The cycloolefin addition polymer obtained by the invention can be used not only for optical materials but also for electronic/electric parts, medical equipment materials, electrical insulating materials and packaging materials.

Examples of the optical materials for which the cycloolefin addition polymer is employable include light guide plates, protective films, deflection films, phase difference films, touch panels, transparent electrode substrates, optical recording substrates, such as CD, MD and DVD, optical lenses, and sealing materials.

Examples of the electronic/electric parts for which the cycloolefin addition polymer is employable include liquid crystal elements, liquid crystal substrates, containers, trays, carrier tapes, separation films, cleaning containers, pipes, and tubes.

Examples of the medical equipment materials for which the cycloolefin addition polymer is employable include medicine containers, ampoules, syringes, infusion fluid bags, sample containers, test tubes, blood-collecting tubes, sterilizing containers, pipes, and tubes.

Examples of the electrical insulating materials for which the cycloolefin addition polymer is employable include coating materials of electrical wires and cables, insulating materials of OA machines such as computer, printer and copy machine, and insulating materials of printed boards.

The invention claimed is:

1. A process for producing a cycloolefin addition polymer, comprising
   addition-polymerizing one or more cycloolefin monomers comprising a cycloolefin compound represented by formula (2)-1 or formula (2)-2, in the presence of a multi-component catalysts comprising:
   (a) a palladium compound, and
   (b) one or more phosphorus compounds selected from the group consisting of compounds (b-1) and (b-2):
   wherein (b-1) comprises a phosphonium salt represented by formula (b1):

[PR$^2$R$^3$R$^4$R$^5$]+[CA$_1$]-      (b1)

wherein P is a phosphorus atom,
   R$^2$ is a substituent selected from the group consisting of a hydrogen atom, an alkyl group of 1 to 20 carbon atoms, a cycloalkyl group and an aryl group,
   R$^3$ to R$^5$ are each independently a substituent selected from the group consisting of an alkyl group of 1 to 20 carbon atoms, a cycloalkyl group and an aryl group, and
   [CA$_1$]$^-$ is a counter anion selected from the group consisting of a carboxylic acid anion, a sulfonic acid anion and a superstrong acid anion comprising an atom selected from the group consisting of B, P Sb and F,
   wherein (b-2) comprises an addition complex of
   a phosphine compound that comprises a substituent selected from the group consisting of an alkyl group of 3 to 15 carbon atoms, a cycloalkyl group and an aryl group, wherein the addition complex has a cone angle (θ deg) of 170 to 200,
   and an organoaluminum compound;

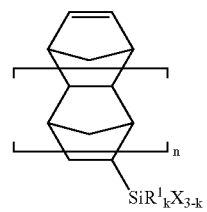

(2)-1

(2)-2

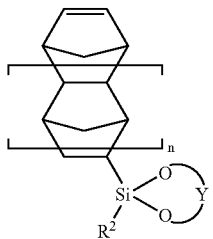

wherein R¹ and R² are each a substituent selected from the group consisting of an alkyl group of 1 to 10 carbon atoms, a cycloalkyl group and an aryl group, wherein X is selected from the group consisting of an alkoxy group of 1 to 5 carbon atoms and a halogen atom, wherein Y is a residue of a hydroxyl group of an aliphatic diol comprising 2 to 4 carbon atoms, wherein k is an integer of 0 to 2, and n is 0 or 1; to form the cycloolefin addition polymer.

2. The process for producing a cycloolefin addition polymer as claimed in claim 1, wherein the multi-component catalyst further comprises, in addition to the component (a) and the component (b-1), (c) a compound selected from the group consisting of an ionic boron compound, an ionic aluminum compound, an aluminum compound of Lewis acidity and a boron compound of Lewis acidity.

3. The process for producing a cycloolefin addition polymer as claimed in claim 1, wherein the multi-component catalyst further comprises, in addition to the component (a) and the component (b-2), (d) an organoaluminum compound.

4. The process for producing a cycloolefin addition polymer as claimed in claim 3, wherein the content of the organoaluminum compound (d) is in the range of 0.1 to 200 mol based on 1 gram atom of palladium of the palladium compound (a).

5. The process for producing a cycloolefin addition polymer as claimed in claim 1, wherein the palladium compound (a) is an organic carboxylate of palladium or a β-diketone compound of palladium.

6. The process for producing a cycloolefin addition polymer as claimed in claim 1, wherein the multi-component catalyst is a catalyst prepared in the presence of at least one compound selected from the group consisting of a polycyclic monoolefin comprising a bicyclo[2.2.1]hept-2-ene structure, a non-conjugated diene comprising a bicyclo[2.2.1]hept-2-ene structure, a monocyclic non-conjugated diene, a straight-chain non-conjugated diene, and combinations thereof.

7. The process for producing a cycloolefin addition polymer as claimed in claim 1, wherein the multi-component catalyst is a catalyst prepared in the presence of bicyclo[2.2.1]hept-2-ene, a bicyclo[2.2.1]hept-2-ene derivative comprising one or more hydrocarbon groups comprising 1 to 15 carbon atoms, or a combination thereof.

8. The process for producing a cycloolefin addition polymer as claimed in claim 1, wherein the cycloolefin compound of formula (2)-1 or formula (2)-2 is used in a total amount of 0.1 to 30% by mol in the whole amount of all the cycloolefin monomers.

9. The process for producing a cycloolefin addition polymer as claimed in claim 2, wherein the multi-component catalyst further comprises (d) an organoaluminum compound.

10. The process for producing a cycloolefin addition polymer as claimed in claim 9, wherein the content of the organoaluminum compound (d) is in the range of 0.1 to 200 mol based on 1 gram atom of palladium of the palladium compound (a).

11. The process for producing a cycloolefin addition polymer as claimed in claim 2, wherein the palladium compound (a) is an organic carboxylate of palladium or a β-diketone compound of palladium.

12. The process for producing a cycloolefin addition polymer as claimed in claim 3, wherein the palladium compound (a) is an organic carboxylate of palladium or a β-diketone compound of palladium.

13. The process for producing a cycloolefin addition polymer as claimed in claim 4, wherein the palladium compound (a) is an organic carboxylate of palladium or a β-diketone compound of palladium.

14. The process for producing a cycloolefin addition polymer as claimed in claim 2, wherein the multi-component catalyst is a catalyst prepared in the presence of at least one compound selected from the group consisting of a polycyclic monoolefin comprising a bicyclo[2.2.1]hept-2-ene structure, a non-conjugated diene comprising a bicyclo[2.2.1]hept-2-ene structure, a monocyclic non-conjugated diene, a straight-chain non-conjugated diene, and combinations thereof.

15. The process for producing a cycloolefin addition polymer as claimed in claim 3, wherein the multi-component catalyst is a catalyst prepared in the presence of at least one compound selected from the group consisting of a polycyclic monoolefin comprising a bicyclo[2.2.1]hept-2-ene structure, a non-conjugated diene comprising a bicyclo[2.2.1]hept-2-ene structure, a monocyclic non-conjugated diene, a straight-chain non-conjugated diene, and combinations thereof.

16. The process for producing a cycloolefin addition polymer as claimed in claim 4, wherein the multi-component catalyst is a catalyst prepared in the presence of at least one compound selected from the group consisting of a polycyclic monoolefin comprising a bicyclo[2.2.1]hept-2-ene structure, a non-conjugated diene comprising a bicyclo[2.2.1]hept-2-ene structure, a monocyclic non-conjugated diene, a straight-chain non-conjugated diene, and combinations thereof.

17. The process for producing a cycloolefin addition polymer as claimed in claim 5, wherein the multi-component catalyst is a catalyst prepared in the presence of at least one compound selected from the group consisting of a polycyclic monoolefin comprising a bicyclo[2.2.1]hept-2-ene structure, a non-conjugated diene comprising a bicyclo[2.2.1]hept-2-ene structure, a monocyclic non-conjugated diene, a straight-chain non-conjugated diene, and combinations thereof.

18. The process for producing a cycloolefin addition polymer as claimed in claim 2, wherein the multi-component catalyst is a catalyst prepared in the presence of bicyclo[2.2.1]hept-2-ene, a bicyclo[2.2.1]hept-2-ene derivative comprising one or more hydrocarbon groups comprising 1 to 15 carbon atoms, or a combination thereof.

* * * * *